US009850159B2

(12) United States Patent
Bhuyan et al.

(10) Patent No.: US 9,850,159 B2
(45) Date of Patent: Dec. 26, 2017

(54) HIGH SPEED LASER PROCESSING OF TRANSPARENT MATERIALS

(71) Applicant: UAB ALTECHNA R&D, Corning, NY (US)

(72) Inventors: Manoj K. Bhuyan, Como (IT); Ottavia Jedrkiewicz, Como (IT); Paolo Di Trapani, Cavallasca (IT); Vytautas Sabonis, Vievis (LT); Mindaugas Mikutis, Vilnius (LT)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/443,751

(22) PCT Filed: Nov. 20, 2013

(86) PCT No.: PCT/EP2013/003508
§ 371 (c)(1),
(2) Date: May 19, 2015

(87) PCT Pub. No.: WO2014/079570
PCT Pub. Date: May 30, 2014

(65) Prior Publication Data
US 2015/0299018 A1  Oct. 22, 2015

(30) Foreign Application Priority Data

Nov. 20, 2012  (WO) ................. PCT/EP2012/073099

(51) Int. Cl.
*C03B 33/02* (2006.01)
*B23K 26/00* (2014.01)
*B23K 26/40* (2014.01)
*C03B 33/033* (2006.01)
*B23K 103/00* (2006.01)

(52) U.S. Cl.
CPC ...... *C03B 33/0222* (2013.01); *B23K 26/0057* (2013.01); *B23K 26/0087* (2013.01);
(Continued)

(58) Field of Classification Search
CPC ... C03B 33/0222; C03B 33/07; C03B 33/072; C03B 33/091; C03C 21/00–21/008
See application file for complete search history.

(56) References Cited

U.S. PATENT DOCUMENTS 1,790,397 A   1/1931   Woods et al.
2,682,134 A   6/1954   Stookey
(Continued)

FOREIGN PATENT DOCUMENTS

CN   2388062 Y    7/2000
CN   1283409 C   11/2006
(Continued)

OTHER PUBLICATIONS

Bhuyan, M.K., Salut, R., Courvoisier, F., High aspect ratio nanochannel machining using single shot femtosecond Bessel beams:, Applied Physics Letters 97, 081102 (2010).*
(Continued)

*Primary Examiner* — Jason L Lazorcik
(74) *Attorney, Agent, or Firm* — Kevin L. Bray

(57) ABSTRACT

A method and system for laser pre-cutting a layered material (31) with a laser beam (14) is disclosed. The layered material (31) comprises at least one tensile stress layer (TSL), at least one compression stress layer (CSL1, CSL2), and at least one interface region (IR1, IR2) between the at least one tensile stress layer (TSL) and the at least one compression stress layer (CSL1, CSL2) and is transparent to allow propagation of the laser beam (14) through the layered material (31). The method may comprise setting an optical beam path (8) and a laser characteristic of the laser beam (14) such that an interaction of the laser beam (14) with the layered material (31) generates an elongate damage region (57) in the layered material (31), and, for each of a series of pre-cut positions $(X_{N-1}, X_N, X_{N+1})$ of the layered material (31), pre-cutting the layered material (31) by positioning the layered material
(Continued)

(31) and the laser beam (14) with respect to each other and irradiating the laser beam (14) such that the respective elongate damage regions (57) extend across the at least one interface region (IR1, IR2).

18 Claims, 8 Drawing Sheets

(52) U.S. Cl.
CPC .......... *B23K 26/40* (2013.01); *B23K 2203/50* (2015.10); *C03B 33/033* (2013.01)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2* | 5/2014 | Li .................... C03B 33/091 219/121.72 |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2* | 2/2015 | Gomez ............... C03B 33/0222 65/105 |
| 8,971,053 B2 | 3/2015 | Kariya et al. |
| 9,138,913 B2 | 9/2015 | Arai et al. |
| 9,227,868 B2* | 1/2016 | Matsumoto ........... C03B 33/091 |
| 9,290,407 B2 | 3/2016 | Barefoot et al. |
| 9,296,066 B2* | 3/2016 | Hosseini ............. B23K 26/0057 |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2* | 11/2016 | Bergh ................... B23K 26/38 |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0289410 A1 | 12/2006 | Morita et al. |
| 2007/0051706 A1* | 3/2007 | Bovatsek ........... B23K 26/0617 219/121.69 |
| 2007/0111390 A1 | 5/2007 | Komura et al. |
| 2007/0111480 A1 | 5/2007 | Maruyama et al. |
| 2007/0119831 A1 | 5/2007 | Kandt |

(56) References Cited

U.S. PATENT DOCUMENTS

| | | |
|---|---|---|
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1* | 5/2008 | Misawa .................. B29C 59/16 216/94 |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0206008 A1* | 8/2010 | Harvey ............... C03B 33/0222 65/105 |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1* | 11/2010 | Dejneka ............. C03B 33/0222 428/192 |
| 2010/0320179 A1 | 12/2010 | Morita et al. |
| 2010/0326138 A1 | 12/2010 | Kumatani et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1* | 8/2012 | Cornejo .................. B28D 1/00 428/43 |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1* | 11/2013 | Saito .................. B23K 26/0057 65/112 |
| 2013/0312460 A1 | 11/2013 | Kunishi et al. |
| 2013/0323469 A1* | 12/2013 | Abramov ............ C03B 33/0222 428/155 |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1* | 6/2014 | Saito ....................... C03B 33/04 65/28 |
| 2014/0174131 A1 | 6/2014 | Saito et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0280580 A1 | 9/2016 | Bohme |
| 2016/0290791 A1 | 10/2016 | Buono et al. |
| 2017/0169847 A1 | 6/2017 | Tamaki |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |

(56) References Cited

FOREIGN PATENT DOCUMENTS

| | | |
|---|---|---|
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 | 1/1974 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

Bhuyan, M. et al. "Femtosecond non-diffracting Bessel beams and controlled nanoscale ablation"; General Assembly and Scientific Symposium, 2011 XXXth URSI; Aug. 2011.

Bhuyan, M. et al. "High aspect ratio nanochannel machining using single shot femtosecond Bessel beams"; American Institute of Physics; Applied Physics Letters 97, 081102; Aug. 2010.

International Search Report for international Application No. PCT/EP2013/003508 dated Feb. 2, 2014.

Abakians, H. et al.; Evaporative Cutting of a Semitransparent Body With a Moving CW Laser; Journal of Heat Transfer; Nov. 1988; pp. 924-930; vol. 110; ASME.

(56) References Cited

OTHER PUBLICATIONS

Ahmed, F. et al.; Display glass cutting by femtosecond laser induced single shot periodic void array; Applied Physics A Material Science & Processing; Jun. 3, 2008; pp. 189-192; vol. 93; Springer-Verlag.

Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

Bhuyan, M.K. et al.; Femtosecond non-diffracting Bessel beams and controlled nanoscale ablation; ResearchGate Conference Paper; Sep. 2011; pp. 1-4.

Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.

Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.

Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.

Case Design Guidelines for Apple Devices; Sep. 13, 2013; pp. 1-58; Apple Inc.

Chiao, R. Y. et al.; Self-Trapping of Optical Beams; Physical Review Letters; Oct. 12, 1964; pp. 479-482; vol. 13, No. 15.

Corning Eagle AMLCD Glass Substrates Material Information; Apr. 2005; pp. MIE 201-1-MIE 201-3; Corning Incorporated.

Corning 1737 AMLCD Glass Substrates Material Information; Aug. 2002; pp. MIE 101-1-MIE 101-3; Corning Incorporated.

Couairon, A. et al.; Femtosecond filamentation in transparent media; ScienceDirect Physical Reports; Feb. 6, 2007; pp. 47-189; vol. 441; Elsevier B.V.

Courvoisier, F. et al.; Applications of femtosecond Bessel beams to laser ablation; Applied Physics A Materials Science & Processing; Sep. 6, 2012; pp. 29-34; vol. 112; Springer-Verlag.

Courvoisier, F. et al.; Surface nanoprocessing with nondiffracting femtosecond Bessel beams; Optics Letters; Oct. 15, 2009; pp. 3163-3165; vol. 34, No. 20; Optical Society of America.

Dong, M. et al.; On-axis irradiance distribution of axicons illuminated by spherical wave; ScienceDirect Optics & Laser Technology; Sep. 2007; pp. 1258-1261; vol. 39; Elsevier Ltd.

Duocastella, M. et al.; Bessel and annular beams for materials processing; Laser & Photonics Reviews; 2012; pp. 607-621; vol. 6, No. 5.

Durnin, J.; Exact solutions for nondiffracting beams. I. The scalar theory; J. Opt. Soc. Am. A; Apr. 1987; pp. 651-654; vol. 4, No. 4; Optical Society of America.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.

Wang, Z. et al.; Investigation on $CO_2$ laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

(56) References Cited

OTHER PUBLICATIONS

Xu, H. et al.; Optimization of 3D laser cutting head orientation based on minimum energy consumption; Int J Adv Manuf Technol; Jun. 28 2014; pp. 1283-1291; vol. 74; Springer-Verlag London.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

Abramov et al., "Laser separation of chemically strengthened glass"; Physics Procedia 5 (2010) 285-290, Elsevier.; doi: 10.1016/j.phpro.2010.08.054. E.

Arimoto et al., "Imaging properties of axicon in a scanning optical system"; Applied Optics, Nov. 1, 1992, vol. 31, No. 31, pp. 6653-6657.

"TruMicro 5000" Product Manual, Trumpf Laser GmbH + Co KG, pp. 1-4, Aug. 2011.

Bhuyan et al., "High aspect ratio nanochannel machining using single shot femtosecond Bessel beams"; Applied Physics Letters 97, 081102 (2010); doi: 10.1063/1.3479419.

Bhuyan et al., "High aspect ratio taper-free microchannel fabrication using femtosecond Bessel beams"; Optics Express (2010) vol. 18, No. 2, pp. 566-574.

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance"; Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

"EagleEtch" Product Brochure, EuropeTec USA Inc., pp. 1-8, Aug. 1, 2014.

Girkin et al., "Macroscopic rnultiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

Krüger et al., "Femtosecond-pulse visible laser processing of transparent materials"; Applied Surface Science 96-98 (1996) 430-438.

Krüger et al., "Laser micromachining of barium aluminium borosilicate glass with pluse durations between 20 fs and 3 ps"; Applied Surface Science 127-129 (1998) 892-898.

Krüger et al., "Structuring of dielectric and metallic materials with ultrashort laser pulses between 20 fs and 3 ps"; SPIE vol. 2991, 0277-786X/97, pp. 40-47.

Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.

Perry et al., "Ultrashort-pulse laser machining"; UCRL-JC-132159 Rev 1., Jan. 22, 1999, pp. 1-24.

Perry et al., "Ultrashort-pulse laser machining"; UCRL-ID-132159, Sep. 1998, pp. 1-38.

Perry et al., "Ultrashort-pulse laser machining of dielectric materials"; Journal of Applied Physics, vol. 85, No. 9, May 1, 1999, American Institute of Physics, pp. 6803-6810.

"PHAROS High-power femtosecond laser system" product brochure; Light Conversion, Vilnius, LT; Apr. 18, 2011, pp. 1-2.

Polynkin et al., "Extended filamentation with temporally chirped femtosecond Bessel-Gauss beams in air"; Optics Express, vol. 17, No. 2, Jan. 19, 2009, OSA, pp. 575-584.

Serafetinides et al., "Ultra-short pulsed laser ablation of polymers"; Applied Surface Science 180 (2001) 42-56.

Sundaram et al., "Inducing and probing non-thermal transitions in semiconductors using femtosecond laser pulses"; Nature Miracles, vol. 1, Dec. 2002, Nature Publishing Group (2002), pp. 217-224.

Vanagas et al., "Glass cutting by femtosecond pulsed irradiation"; J. Micro/Nanolith. MEMS MOEMS. 3(2), 358-363 (Apr. 1, 2004); doi: 10.111711.1668274.

Varel et al., "Micromachining of quartz with ultrashort laser pulses"; Applied Physics A 65, 367-373, Springer-Verlag (1997).

Yoshino et al., "Micromachining with a high repetition rate femtosecond fiber laser"; JLMN—Journal of Laser Micro/Nanoengineering vol. 3, No. 3 (2008), pp. 157-162.

Zeng et al. "Characteristic analysis of a refractive axicon system for optical trepanning"; Optical Engineering 45(9), 094302 (Sep. 2006), pp. 094302-1-094302-10.

Zhang et al, "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

\* cited by examiner

HIGH SPEED LASER PROCESSING OF TRANSPARENT MATERIALS

TECHNICAL FIELD

The present disclosure relates generally to laser cutting of transparent materials such as glass, and more particularly to laser cutting using Bessel-like beam configurations.

BACKGROUND

Laser processing of material, specifically the controlled interaction of laser light with material, is well established in various fields of applications such as laser cutting and laser welding, be it, for example, in industrial as well as medical applications. The interaction depends on the laser light parameters such as wave length, focus zone, laser power etc. as well as the material properties such as absorption at the respective wave length, band gap of the material etc. In combination, those parameters and properties define the interaction that takes place and in particular the field strength that is provided at a specific position within the material. A thermal approach is disclosed in US 2009/0294419 A1 using a system for laser scoring of non-flat materials based on thermal shock generation by a moving laser beam and with subsequent local cooling.

US 2011/0183116 A1 and US 2012/0064306 A1 disclose examples for laser processing methods for cutting glass, specifically tempered glass. In particular, for tempered glass the internal stress distribution affects the cutting. Accordingly, US 2012/0064306 A1 discloses not to treat the cutting region while US 2011/0183116 A1 disclose providing a trench structure formed in a compression stress layer along a predetermined cutting path.

A method for fabricating strengthened glass panels from glass substrate sheets is disclosed in 2012&0196071 A1. Therein, at first holes are prepared, e.g. by laser processing, mechanical drilling or etching processes, and then the strengthening process is applied, i.e. after the formation of the series of holes. This results in radially compressive stress layers formed along the wall sides of the holes.

Specifically when applying pulsed laser systems, laser pulse energies as well as laser pulse durations may be well controllable and, thus, be adapted to the specific application. JP 2005/288503 A discloses a laser beam machining method based on a laser light interaction that uses self-focusing as well as a Bessel beam shape for cutting glass prior treatment.

The use of Bessel beams for laser processing is disclosed, for example, in "High aspect ratio nanochannel machining using single shot femtosecond Bessel beams" by M. K. Bhuyan eta al., Applied Physics Letters 97, 081102-1 (2010) and "Femtosecond non-diffracting Bessel beams and controlled nanoscale ablation" by M. K. Bhuyan et al., IEEE (2011).

WO 2012/006736 A1 discloses a method for laser cutting of transparent materials by irradiating the substrate with, for example, a burst train of pulses of a focused laser beam, wherein the focusing condition, the pulse energy and duration were selected to produce a filament within the substrate and the substrate is translated relative to the laser beam. According to WO 2012/006736 A1, filaments are produced by weak focusing, high intensity, short duration laser light, which can self-focus by the nonlinear Kerr effect, resulting in an increase of the peak intensity and the creation of a low-density plasma in the high-intensity portion of the laser beam. In WO 2012/006736 A1 it is further stated that the method avoids dense plasma generation such as trough optical breakdown that may be easily produced in tight optical focusing conditions, wherein the plasma generation mechanism is based on initial multi-photon excitation of electrons, followed by inverse Bremsstrahlung, impact ionization, and electron avalanche processes. According to WO 2012/006736 A1, in this optical breakdown domain the singulation, dicing, scribing, cleaving, cutting and facet treatment of transparent materials has disadvantages such as slow process speed, generation of cracks, contamination by ablation debris, and large kerf width.

The present disclosure is directed, at least in part, to improving or overcoming one or more aspects of prior systems and in particular to providing high precision cutting of tempered glass, which still remains a challenge of the present day technology.

SUMMARY OF THE DISCLOSURE

According to a first aspect of the present disclosure, a method for laser pre-cutting a layered material with a laser beam is disclosed, wherein the layered material comprises at least one tensile stress layer, at least one compression stress layer, and at least one interface region between the at least one tensile stress layer and the at least one compression stress layer and the layered material is transparent to allow propagation of the laser beam through the layered material. The method comprises setting an optical beam path and a laser characteristic of the laser beam such that an interaction of the laser beam with the layered material generates an elongate damage region in the layered material; and, for each of a series of pre-cut positions of the layered material, pre-cutting the layered material by positioning the layered material and the laser beam with respect to each other and irradiating the laser beam such that the respective elongate damage regions extend across the at least one interface region.

According to another aspect, a method for separating a material part from a material that comprises at least one tensile stress layer, at least one compression stress layer, and at least one interface region between the at least one tensile stress layer and the at least one compression stress layer comprises pre-cutting the layered material as disclosed herein, thereby forming, along a separation line, elongate damage regions extending across the at least one interface region, and applying a separating force onto the layered material that acts across the series of pre-cut positions, thereby cleaving the layered material along the series of pre-cut positions.

According to another aspect, a layered material for being separated into at least two layered material parts comprises a front face and a back face opposite to each other, at least one tensile stress layer, at least one compression stress layer, at least one interface region between the at least one tensile stress layer and the at least one compression stress layer, and elongate damage regions formed in the layered material and extending across the at least one interface region.

According to another aspect, a layered material part comprises a front face and a back face opposite to each other, at least one tensile stress layer, at least one compression stress layer, at least one interface region between the at least one tensile stress layer and the at least one compression stress layer, and at least one cut face connecting the front face and the back face, wherein the cut face includes surface structures induced by laser interaction that extend across the at least one interface region.

According to another aspect, a laser processing system for pre-cutting a layered material with a laser beam, comprises a laser light source for providing the laser beam, an optical system for guiding the laser beam from the laser light source to the layered material, a translation mechanism for positioning the layered material with respect to the laser beam, a control unit configured to set an optical beam path and a laser characteristic of the laser beam such that an interaction of the laser beam with the layered material generates an elongate damage region in the layered material and, for each of a series of pre-cut positions of the layered material, and further configured to position the layered material and the laser beam with respect to each other and to irradiate the laser beam such that the respective elongate damage region extends across the at least one interface region, thereby pre-cutting the layered material.

According to another aspect, a method for laser pre-cutting a material with a pulsed Bessel-like laser beam, whereby the material is essentially transparent with respect to single photon absorption of the pulsed Bessel-like laser beam when propagating through the material, comprises setting an optical beam path and a laser characteristic of the pulsed Bessel-like laser beam such that an interaction of a single laser pulse with the material generates an elongate single laser pulse damage region in the material that extends at least through 50% or at least through 70% or at least through 90% of a thickness of the material, and pre-cutting the material by scanning the pulsed Bessel-like laser beam along the material such that single laser pulse damage regions of successive laser pulses following immediately one another are displaced with respect to each other.

According to another aspect, a method for separating a material part from a material comprises pre-cutting the material as disclosed herein, thereby forming, along a cutting path, elongate single laser pulse damage regions at a series of pre-cut positions, and applying a separating force onto the material that acts across the series of pre-cut positions, thereby cleaving the material along the series of pre-cut positions.

According to another aspect, a material for being separated into at least two material parts comprises a front face and a back face opposite to each other, and single laser pulse damage regions formed in the material, extending at least through 50% or at least through 70% or at least through 90% of a thickness of the material, and spatially separated by a distance of at least 2 μm or at least 3 μm or at least 4 μm along a separation line.

According to another aspect, a material part comprises a front face and a back face opposite to each other, and at least one cut face connecting the front face and the back face, wherein the cut face includes surface structures induced by laser interaction extending across at least 50% or at least 70% or at least 90% of a thickness of the material part and the surface structures are spatially separated with respect to each other by a distance of at least 2 μm or at least 3 μm or at least 4 μm.

According to another aspect, a laser processing system for pre-cutting a material with a pulsed Bessel-like laser beam, wherein the material is essentially transparent with respect to single photon absorption of the pulsed Bessel-like laser beam when propagating through the material, comprises a laser light source for providing a pulsed laser beam, an optical system for guiding the pulsed laser beam from the laser light source to the material and transforming the pulsed laser beam into a pulsed Bessel-like laser beam, a translation mechanism for positioning the material with respect to the pulsed Bessel-like laser beam, a control unit configured to set an optical beam path and a laser characteristic of the pulsed Bessel-like laser beam such that an interaction of a single laser pulse of the pulsed Bessel-like laser beam with the material generates an elongate single pulse damage region in the material that extends at least through 50% or at least through 70% or at least through 90% of a thickness of the material and, for each of a series of pre-cut positions of the material, to position the material and the pulsed Bessel-like laser beam with respect to each other and to irradiate the pulsed Bessel-like laser beam such that single laser pulse damage regions of successive laser pulses are displaced with respect to each other, thereby pre-cutting the material.

According to another aspect, a method for laser pre-cutting a layered material with a pulsed Bessel-like laser beam is proposed, wherein the layered material comprises at least one tensile stress layer, at least one compression stress layer, and at least one interface region between the at least one tensile stress layer and the at least one compression stress layer and the layered material is transparent to allow propagation of the laser beam through the layered material. The method comprises setting an optical beam path and a laser characteristic of the laser beam such that an interaction of the laser beam with the layered material generates an elongate single laser pulse damage region in the layered material, and, for each of a series of pre-cut positions of the layered material, pre-cutting the layered material by positioning the layered material and the laser beam with respect to each other and irradiating the laser beam such that the respective elongate single laser pulse damage regions extend across the at least one interface region.

According to another aspect, a method for laser pre-cutting a material with a pulsed Bessel-like laser beam, the material being essentially transparent with respect to single photon absorption of the pulsed laser beam when propagating through the material comprises setting an optical beam path and a laser characteristic of the pulsed laser beam such that an interaction of a single laser pulse with the material generates an elongate single laser pulse damage region in the material that extends at least through 50% or at least through 70% or at least through 90% of a thickness of the material, and pre-cutting the material by scanning the pulsed laser beam along the material such that single laser pulse damage regions of successive laser pulses following immediately one another are displaced with respect to each other.

According to another aspect, a method for laser pre-cutting a material with a pulsed Bessel-like laser beam, the material being essentially transparent with respect to single photon absorption of the pulsed Bessel-like laser beam when propagating through the material, comprises setting an optical beam path and a laser characteristic of the pulsed Bessel-like laser beam such that a single laser pulse is characterized by a pulse duration in the range from 1 ps to 100 ps and a conical half angle is in the range of 5° to 30°, and such that an interaction of a single laser pulse with the material generates an elongate single laser pulse damage region in the material that extends at least through 50% or at least through 70% or at least through 90% of a thickness of the material, and pre-cutting the material by scanning the pulsed Bessel-like laser beam along the material such that single laser pulse damage regions of successive laser pulses following immediately one another are displaced with respect to each other in the range from 1 μm to 4 μm.

According to another aspect, a method for laser pre-cutting a material with a pulsed Bessel-like laser beam, the material being essentially transparent with respect to single photon absorption of the pulsed laser beam when propagating through the material, comprises setting an optical beam path and a laser characteristic of the pulsed laser beam such that an interaction of a single laser pulse with the material generates an elongate single laser pulse damage region in the material, and pre-cutting the material by scanning the pulsed laser beam along the material such that single laser pulse damage regions of successive laser pulses following immediately one another are displaced with respect to each other at a first level within the material for a first scanning sequence and at a second level within the material for a second scanning sequence.

Implementations may include one or more of the following features. In some embodiments, the layered material may comprise a center tensile stress layer or a center compression stress layer that is centered between a pair of interface regions, and wherein the pre-cutting may be performed such that the respective elongate damage regions extend at least through 30% or at least through 50% or at least through 70% or at least through 90% of the center tensile stress layer or the center compression stress layer.

In some embodiments, the pre-cutting may be performed such that the respective elongate damage regions extend at least through 50% or at least through 70% or at least through 90% of a thickness of the layered material.

In some embodiments, the pre-cutting may be performed for neighboring elongate damage regions such that the neighboring elongate damage regions are displaced with respect to each other by a distance of at least 2 µm or at least 3 µm or at least 4 µm.

In some embodiments, the laser beam may be a pulsed Bessel-like laser beam or a filament forming Gaussian beam, and wherein the pre-cutting may be performed with a single laser pulse for each pre-cut position such that the elongate damage regions are a single laser pulse damage regions and/or the layered material is essentially transparent with respect to single photon absorption of the laser beam such as the pulsed Bessel-like laser beam or the filament forming Gaussian beam when propagating through the material.

In some embodiments, the elongate damage regions may extend into a front face or a back face of the layered material, and the separation force may be applied such that the face with the damage therein is separated first.

In some embodiments, a Bessel-like beam with a conical half-angle θ in the range from 7° to 11° (or 5° to 15°, for example set to 9°, may be applied with a pulse duration in the range between 1 ps and 100 ps in single pass application of a series of laser pulses to respective pre-cut positions. The present disclosure discloses a method for laser cutting of transparent materials by irradiating the substrate with a pulse of a so called Bessel-like (laser) beam such as single pass cutting. Bessel-like beams show along a narrow core beam a high fluence region that is supplied with energy from radial outer sections of the beam.

In general, Bessel-like beams such as zero-order Bessel beams, for example, may feature an intense central spot which persists in propagation direction essentially without apparent diffraction—in contrast to the focusing of standard Gaussian beams which is usually strongly diverging after a tight focus. Accordingly, with single pulses of a Bessel-like beam, interaction zones over up to a millimeter and more may be achieved that result in very narrow needle like laser damage regions.

The propagation of intense and ultra-short Bessel-like beams in transparent materials outlines a regime that is intermediate between the filament regime and the tightly focusing regime. In fact, in the filament case, owing to the weak focusing condition, the laser pulse energy essentially propagates along the beam axis. As a consequence, the self-defocusing caused by the weak plasma is supposed to contribute to the clamping of the intensity below a limiting value. In the tight focusing condition, in contrast, all the laser pulse energy is made to converge from all directions toward a common focal point, so much so that said focusing cannot be counteracted by the plasma defocusing anymore, very high fluencies are achieved, triggering the catastrophic processes mentioned above.

In the Bessel-like beam regime, the leaser pulse energy does not propagate on axis, but along directions distributed on a given cone surface, i.e. at a given angle with respect to the axial propagation direction. The Bessel-like beam regime therefore differs both from the filament, wherein the energy mostly flows on axis, and from the tightly focusing regime, wherein the energy flows over all the directions. As a consequence, the energy of the Bessel-like beam is not made to converge to a single (ideal) point, but to a line. In other terms, each point lying onto the focusing line does not receive the entire energy from the pulse, but only the energy from a ring portion of the same. Notably, due to the fact that the energy comes from a side, plasma defocusing may become ineffective, and very high peak fluencies can be obtained, much higher than in the filament regime. However, due to the fact that the incoming energy at each point is limited to a desired value, the catastrophic phenomena typical of the tight focusing regime may not take place.

Based on the above understanding, it is realized that the usage of large-angle Bessel-like beam may lead to peak fluences large enough to cause optical breakdown to occur. However, said breakdown may occur only in a very tiny and precisely localized volume, e.g. in cylindrical like volume around the beam axis having a diameter of the order of the laser wavelength, which therefore may absorb the laser light and becomes the source of strong shock waves, which serve to fabricate the material. However, due to the controlled energy amount coming to every point of the axis, the catastrophic behavior featuring the Gaussian beam tight focusing regime may be carefully avoided.

It is noted that the creation of elongated damage region formed by means of single pulses of Bessel-like laser beams, which may causes optical breakdown inside a needle-shaped volume, which is both very long (e.g. ≥50 µm, ≥100 µm, ≥300 µm, even ≥700 µm) and very thin (e.g. having a diameter ≤2 µm, ≤1.5 µm, ≤1 µm, even ≤0.5 µm), e.g. inside a needle-shaped volume having a length/diameter aspect ratio ≥25, ≥100, ≥500, even ≥1000, may provide for high precision laser cutting of transparent materials. This precision may be owed at least partly to the possibility of controlling the mechanism of energy transfer to matter, e.g. both for what concerns the control of the exact amount of energy needed to locally generate, in single shot, the shock pressure wave (i.e. the wave which is believed to produce the local modification of the material, e.g. the damaging, and/or the local creation of material stress) and for what concerns the control of the exact position in the transverse coordinate plane from which said pressure wave should be generated. Notably, in spite of the fact that the produced elongated damage region may feature a volume that is larger than the volume wherein the breakdown occurs (i.e. the volume wherein the electron plasma density exceed the critical value for absorption), the possibility of operating in single shot regime, i.e. in the absence of any thermal and or mechanical accumulation effect, plays in favor of creating a tiny needle shape damage volume too, e.g. having a diameter in the transverse plane which is not much larger than the diameter of the breakdown volume, e.g. ≤4 times, or ≤3 times, or even ≤2 times the diameter of the breakdown volume. In other terms, the diameter of the damage volume may be ≤2 times, or ≤1.5 times, or even ≤1 times larger than the diameter of the first zero intensity ring of the Bessel-like beam. The possibility of controlling with very high resolution both the transverse size and the position of the elongated damage zone is a key feature of the Bessel-like beam single-pulse laser cutting method of transparent material in the aim of improving the quality (e.g. the sharpness, the curvature, etc.) of the herein disclosed cutting process.

It is further noted that a generic usage of intense and ultra-short pulse Bessel-like beams does not suffice achieving the high-precision cutting regime of above, and particularly for obtaining the desired, localized and controlled, optical breakdown. In fact, as already mentioned, a first request is that said ultra-short pulse Bessel-like beams features a large cone angle, e.g. a conical half-angle ≥4°, ≥7°, ≥10°, even ≥15°, the upper limit being defined by the need of not using more laser pulse energy than what is necessary for the scope, e.g. ≤30° or 25°. The reason why a sufficiently large angle is necessary is because the "Bessel-like beam energy replacement length", i.e. the length along the propagation direction over which a first portion of energy, which has been focused from a first external ring onto the axis, goes away from the same axis and is replaced by a second portion of energy coming from a second external ring, naturally decreases on increasing the cone angle. In fact, larger cone angles support faster energy replacement. On the other hand, owing to the high peak intensity and high peak fluence (energy density), relevant nonlinear process take place at the Bessel-like central peak, among which Kerr induced self-focusing, the plasma induced self-defocusing, self-phase modulation, space-time focusing, conical emission, space-time instabilities, etc., whose presence may hinder the desired dense plasma formation and subsequent optical breakdown to take place. Considering as the "Bessel-like beam non-linear lengths" the characteristic lengths necessary for said non-linear processes to develop up to e disturbing level, for the given peak intensity and fluence, it is evident that, on increasing the Bessel-like beam cone angle, the ratio between the "Bessel-like beam energy replacement length" and (any of) the "Bessel-like beam non-linear lengths" decreases, thus making the (linear) energy replacement mechanism capable of overcoming any nonlinear effects which might cause a saturation in intensity and/or fluency level to occur at a level below what is needed for the optical breakdown.

In addition, it is noticed that the usage of ultra-short pulse Bessel-like beams featuring large cone angles might be not sufficient for obtaining the desired optical breakdown. In fact, if the laser pulse duration is very short, e.g. ≤200 fs, or ≤1 ps, or even ≤7 ps, the peak intensity (for a given pulse energy) may become very high and, thus, the related Kerr nonlinear length becomes very short. As a consequence, severe instabilities might dominate which hinder the dense plasma to be formed. In contrast, on increasing the pulse duration, e.g. for pulse duration ≥0.5 ps, ≥1 ps, ≥5 ps, even ≥10 ps, the upper limit being below the range around 100 ps (the person skilled in the art will be able to evaluate the optimum value depending, e.g., on the material, the laser-pulse wavelength, etc.), and thus reducing peak intensity, electron avalanche ionization, which is virtually not effective in the fs regime, may start to play a relevant role in boosting the plasma density up to the desired critical value, thus taking over the role of multi-photon ionization, which, in contrast, dominates the fs regime.

In view of the above, an optimal condition for obtaining high-precision cutting of transparent material by means of single-pulse Bessel like beams relies upon the combined usage of both sufficiently large cone angles and sufficiently long pulse duration, e.g. in some embodiments: half width cone angle ≥4°, ≥7°, ≥10°, even ≥15°, the upper limit being defined by the need of not using more laser pulse energy than what is necessary for the scope, e.g. ≤30°, and a pulse duration ≥0.5 ps, ≥1 ps, ≥5 ps, even ≥10 ps, the upper limit being, for example, around 100 ps. In light of the disclosure herein, the person skilled in the art will be able to evaluate the optimum choice of cone angle and pulse duration, depending, e.g., on the material, the laser-pulse wavelength, the available laser pulse energy, the desired length of the damage zone (i.e. the sample thickness and/or the number of scans at different depth which can be made), keeping in mind that, for the reasons provided above, for a given pulse energy and beam size, larger durations (within the specified range) allow slightly smaller cone angles, and thus slightly longer damage regions, than shorter ones.

Furthermore, the foregoing considerations clarify the underlying physical mechanism and the relative importance of the key linear and nonlinear phenomena which may take part in the herein disclosed pre-cutting process. The person skilled in the art may identify different parameters ranges, e.g. different cone angles or duration, for example, when different materials (e.g. polymers, ceramics, semiconductors, solid and liquid crystals, live tissues, etc.) and different laser wavelengths are used.

Some advantages of using Bessel-like beams over the filament regime for laser cutting of transparent materials may include:

The mechanism leading to laser pulse energy transfer to matter for the Bessel-like beam does not require any nonlinear modification of the beam profile (e.g. self-focusing/defocusing). As a consequence, the effect produced by the Bessel-like beam is more robust with respect to fluctuations, e.g. in pulse energy, pulse duration, focusing position, sample thickness, etc.

The mechanism leading to the generation of a long and thin volume wherein high fluence is generated does not rely upon nonlinear beam and pulse shaping, but only on the linear input-beam focusing condition (see below). As a consequence, arbitrarily long channels (e.g. with arbitrarily large length/width aspect ratio) may be implemented, if sufficient optics and beam width are available. This is not the case in the nonlinear regime.

The mechanism leading to laser pulse energy transfer to matter for the Bessel-like beam may rely upon optical breakdown, and thus strong induced local absorption of the laser light by the matter. This circumstance allows easy creation of the elongated damage region of the desired length by using just a single laser pulse, i.e. without the need of a pulse sequence or a burst train of pulses. In addition, due to the breakdown induced absorption, the total laser power necessary to cut the material is expected to be less than for the filament regime.

The details of several embodiments of the herein disclosed inventions are set forth in the accompanying drawings and the description below. Other aspects, features, objects, and advantages of the inventions will be apparent from the following description and accompanying drawings, and from the claims.

DETAILED DESCRIPTION

Figure 1:
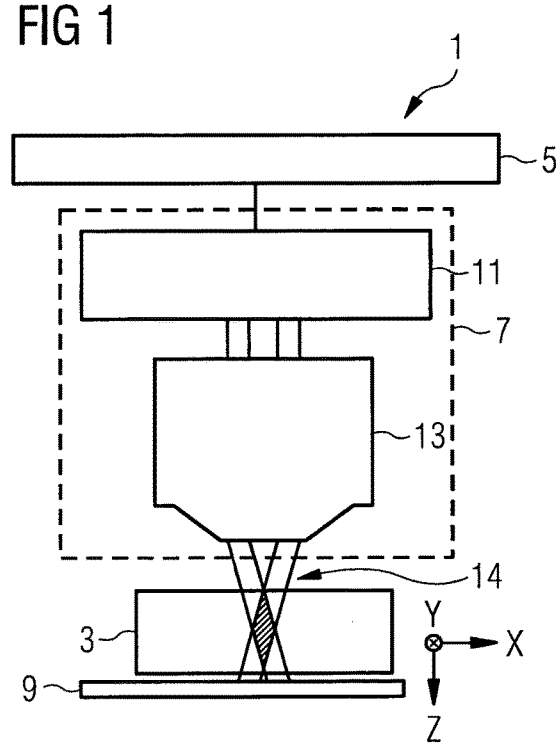
FIG. 1 is a schematic representation of a laser system for cutting of materials by employing a Bessel-like beam.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that interaction of laser light with a material may restructure the material along the laser propagation direction, and, for example, result in modified regions within the material, herein also referred to as elongate (internal) damage regions. Providing those internal modified regions along a separation line over a specific range of the thickness of the material and/or at a specific position within the material and/or at a specific distance from each other and/or with a specific diameter allows influencing the cleaving behavior of the material across the separation line.

For example, providing those internal modified regions across an interface region between stress layers in tempered glass may even allow cleaving tempered glass, i.e. after the tempering process. In addition or alternatively, providing those internal modified regions across a specific range of the thickness of a transparent material such as, for example, glass, sapphire, or tempered glass may allow cleaving parts from the material with a high quality cut face.

Thus, it was discovered that operation in single shot/single pass mode may improve the cut quality and, at the same time, may increase the cutting speed. The internal modified regions may essentially extend cylinder-like along the laser beam propagation. During the cleaving, internal modified regions induce a preferred separation plane within the material. When the separation takes place, along that plane the modified material may be associated with on of the cut faces such that one cut face includes the modified material while the other includes a counter-fitting structure. For example, one cut face may have sections with the shape of parallel tubular voids while the other shows parallel axial cylinder-sections, such as "the negative form" as well as "the positive form" of the modified regions. Thereby, a region with a similar topology may be formed that includes surface structures of tubular voids and/or cylinder-sections with an aspect ratio equal to or larger than 10 or 100 such as in the range from 10 to 1000 or 20 to 500 or 50 to 100.

For laser interaction resulting wherein an ablated material area is tube-like surrounded by material with a modified index of refraction, both cut faces may show half-pipes if the cleaving plane extends across the ablated material area. Within the cut faces, various sections may include different types of such surface structures. However, as long as the cleaving is affected by the laser pre-cutting, the plane of the cleaving extends within a very low roughness (for example in the range below 30 μm such as below 1 μm—roughnesses of about 0.5 μm were achieved) and, thus, a precision cut surfaces can be achieved, both for un-tempered as well as tempered transparent materials.

The methods and systems disclosed herein are moreover directed to ensuring high speed, high precision, and high reproducibility and may in particular be directed to processing layered materials such as processing of tempered glass that has several stress layers.

Specifically, single pass cutting is disclosed using a laser beam having a Bessel-like beam configuration as Bessel-like beams show along a narrow core beam a high fluence region that is supplied with energy from radial outer sections of the beam.

Bessel-like beams such as zero-order Bessel beams, for example, may feature an intense central spot which persists in propagation direction essentially without apparent diffraction—in contrast to the focusing of standard Gaussian beams which is usually strongly diverging after a tight focus. Accordingly, with single laser Bessel-like laser beam pulses, interaction zones over up to a millimeter and more may be achieved that result in a very narrow needle like laser damage regions.

The disclosure is further based in part on the realization that, by placing laser modified regions including index of refraction modified regions and nano-channels (for example created in glass with Bessel-like beams such as zero-order Bessel beams of conical half-angle higher than 17 degrees in air) close to each other, one may create a pre-cut material which may be cleaved to form a planar crack and allow an easy separation of a bulk material into pieces upon applying pressure on either side of a respective modified regions.

Moreover, the disclosure is based in part on the realization that a single-shot Bessel-like beam induced damage of tempered glass may allow precision cutting of the material provided that the induced damage extends over an interface region and/or covers, for example, the combination of one compression stress layer and the entire tensile stress layer.

Bessel-like beams are characterized by concentric fringes in the radial intensity profile. Bessel-like beams may have, for example, a transverse intensity profile of, for example, a zeroth order Bessel beam. Moreover, (radially) truncated Bessel-like beams may be generated when passing through a diaphragma or any radially limiting optical element thereby creating, for example, so called apodized Bessel beams. In some embodiments, Bessel-like beams may be generated from Gaussian beams and, therefore, be referred to as apodized Bessel-Gauss beams.

For pre-cutting thick samples, Bessel-like beams of very long non-diffracting zone may be used. When maintaining the aperture of optical elements within an optical system, one may in principle achieve longer (extended) condensed-beam zone (i.e. longer "non-diffracting zone") by reducing the cone angle of the Bessel-like beam. Moreover, it was discovered that, for a given duration of laser pulses, a defined limit exists for the minimum cone angle of the Bessel-like beam above which elongated damage is caused that is capable of leading to precise single-shot and single pass material laser cut.

If Bessel-like beams are used with cone angles below said threshold, single shot laser pre-cutting may no longer be possible due to the reduced insufficient length of the laser modified regions such that multi-shot operation (for example, ten pulses for each position) may become necessary, for example, with Gaussian beams.

Moreover, it was discovered that, for a given aperture of the optical elements, the above mentioned limit in minimum cone angle (i.e. the limit in the maximum length of the condensed-beam zone which defines the maximum thickness of a material that can be pre-cut) may be overcome by increasing the duration of the laser pulses. It is assumed that during the longer interaction period of the laser pulse with the material, electrons generated by multi-photon ionization are multiplied in number by electron avalanche ionization. In other words, the dependence of (i) the minimum cone angle of the Bessel-like beams allowing producing the required elongate damage region on (ii) laser pulse duration was discovered. Specifically, the minimum required cone angle decreases when increasing the pulse duration.

In this way, selecting a regime for optical beam path parameters and laser characteristic parameters of the laser beam may allow pre-cutting tempered glass of a thickness of, for example, 0.75 mm, which is a thickness typical for mobile phone window screens. The pre-cutting may be precisely preformed in a single-shot, single-pass regime using low-cost, commercial, high repetition rate short pulse lasers such as picosecond or femtosecond lasers. Notably, for some regimes of parameters only picosecond-pulse Bessel-like beams may need to be used instead of femtosecond-pulse durations.

In the following, exemplary laser systems and their application within a laser pre-cutting machine are disclosed in connection FIG. 1 to FIG. 5. In connection with FIG. 6 to FIG. 11, aspects of positioning of a material with respect to a Bessel-like beam's peak fluence distribution in propagation direction are disclosed. In connection with FIG. 16 to FIG. 18, FIG. 22, and FIG. 23, aspects of resulting cleaving faces of a material being pre-cut as proposed herein are disclosed. In connection with FIG. 19 to FIG. 21, aspects of the dependence of the laser material interaction on optical beam path parameters and laser characteristic parameters are disclosed. In connection with FIG. 24 form effects onto the lateral shape of a damage region are discussed exemplarily for a bent scan. In connection with FIGS. 25a) and 25b), multi-scan sequences are disclosed using scan section displaced in propagation direction.

Referring to FIG. 1, an exemplary laser processing system 1 for processing a transparent sample 3 by employing a Bessel-like laser beam comprises a laser system 5, an optical system 7, and an X-Y-Z translation mechanism 9.

Laser system 5 is configured to deliver short laser pulses of a specifically adjustable temporal duration. An example of laser system 5 is a Pharos laser providing laser pulses of a minimum pulse duration of 230 fs at a central wavelength of 1030 nm with a pulse repetition rate up to 600 kHz.

Optical system 7 comprises a Bessel-like beam shaping optical system 11 and an objective 13 for creating a Bessel-like beam based an a Gaussian beam provided by laser system 1 and for focusing the same onto sample 3.

Figure 2:
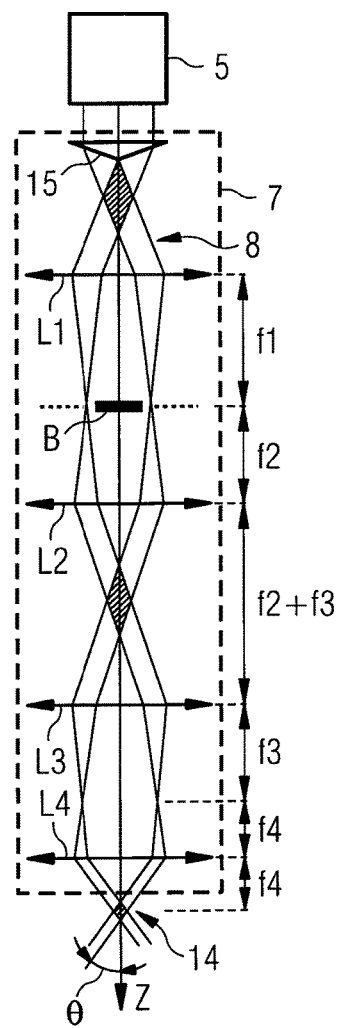
FIG. 2 is a diagram illustrating the Bessel-like beam formation in the optical system of the laser system of FIG. 1.

Referring to FIG. 2, an exemplary configuration of optical components defines an optical beam path 8 along beam propagation axis Z of optical system 7. Specifically, optical system 7 includes a telescopic arrangement to produce a high quality Bessel-like beam via spatial filtering. For example, optical system 7 comprises an axicon lens 15 having, for example, an apex angle of 178°, a first lens L1 with focal length f1, an opaque block B, a second lens L2 with focal length f2, a third lens L3 with focal length f3, and a fourth lens L4 with focal length f4 of objective 13. Opaque block B is placed at the focal plane of lens L1 and forms a spatial filtering system blocking undesired beam sections; for example, the Gaussian beam leaking through a curved tip of axicon lens 15. Lenses L2 and L3 form a telescopic beam imaging system used to de-magnify the Bessel-like beam generated after the axicon lens 15. Fourth lens L4 of objective 13 sets a conical half angle $\theta$ of the Bessel-like beam and focuses the same onto sample 3. With such a configuration of optical components, Bessel-like beams may be formed having a conical half angle $\theta$ in the range from 7° to 12° or even in the range from 5° to 18°.

Referring to the embodiment shown in FIG. 2, optical system 7 may be used to produce, for example, zero-order Bessel-like beams, lens L1 may be a plano-convex lens of focal length f1 varying from 100 mm to 250 mm depending on the required Bessel beams, lens L2 and lens L3 may be plano-convex lenses of focal length f2 and f3, respectively, which are kept fixed at, for example, 300 mm. Lens L4 is a microscope objective lens of magnification 20× and numerical aperture of 0.4.

Translation mechanism 9 may be configured for positioning sample 3 with respect to the Bessel-like laser beam along laser propagation axis Z as well as in directions X and Y being, for example, orthogonal with respect to laser propagation axis Z. While in FIG. 1, translation mechanism 9 is configured to support sample 3, alternatively or additionally, a translation mechanism may be provided for moving laser system 3 and/or optical system 7 with respect to sample 3.

Figure 3:
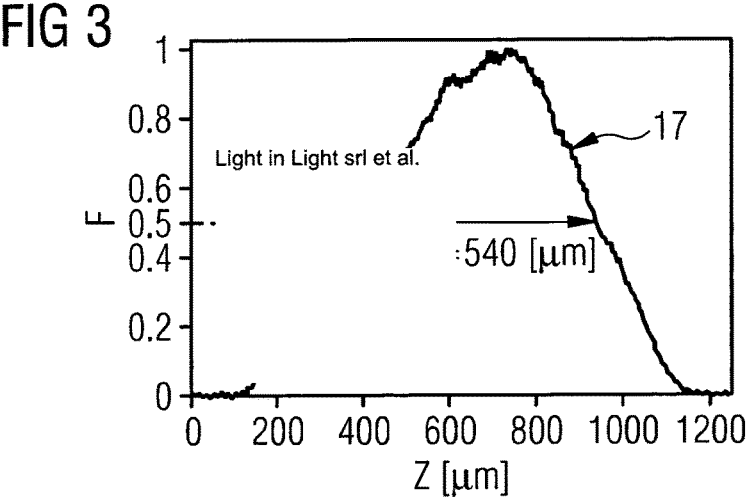
FIG. 3 is an exemplary profile of the peak fluence at the focus in direction of the laser propagation.

Referring to FIG. 3, an exemplary longitudinal fluence profile 17 of the peak fluence measured along propagation axis Z is shown. Specifically, a normalized beam fluence F at the central beam peak (normalized peak fluence) is indicated in dependence of the position in Z-direction. Thereby, fluence is defined as the energy density in J/cm2. For an experimentally generated Bessel-like beam of a conical half angle θ of 9° in air, the full width at half-maximum (FWHM) value of longitudinal fluence profile 17 along the beam-propagation direction is measured to be 540 µm. Longitudinal fluence profile 17 shows its maximum at about the longitudinal position Z=800 µm. The FWHM within an optical material will in general be longer for materials having an index of refraction larger 1, such as an index of refraction of about 1.5 will result in a FWHM value of about 800 µm.

Figure 4:
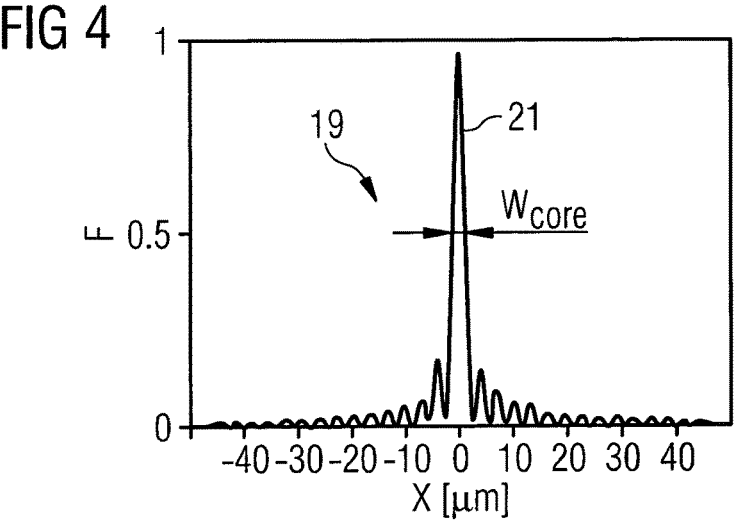
FIG. 4 is an exemplary radial profile of the fluence at the peak fluence of FIG. 3.

FIG. 4 shows an exemplary transverse fluence profile 19 illustrating a normalized peak fluence in dependence of a position in X direction, i.e. orthogonal to Z direction. Specifically, transverse fluence profile 19 is taken at the longitudinal position Z=800 µm of FIG. 3 for the experimentally generated Bessel-like beam of conical half angle 9°. Transverse fluence profile 19 shows several characteristic concentric fringes across the beam diameter that are set by the respective beam apodisation function of the Bessel-like beam. The full width at half-maximum Wcore of a central core 21 of the Bessel-like beam is at Z=800 µm about 2.5 µm.

The beam apodization function may be set via the real apodization FWHM diameter Dapod measured at the entrance of the axicon lens 15. It is set in dependence of the conical half-angle θ, the length of the single laser pulse damage region L, the demagnification 1/M of the optical system 7 without the axicon lens 15, wherein M is larger 1, the refractive index n of the material, and, for example, a selectable parameter k, with 0.5<k<2, according to the equation: Dapod=k*2*L/n*tg(θ)*M.

Figure 5:
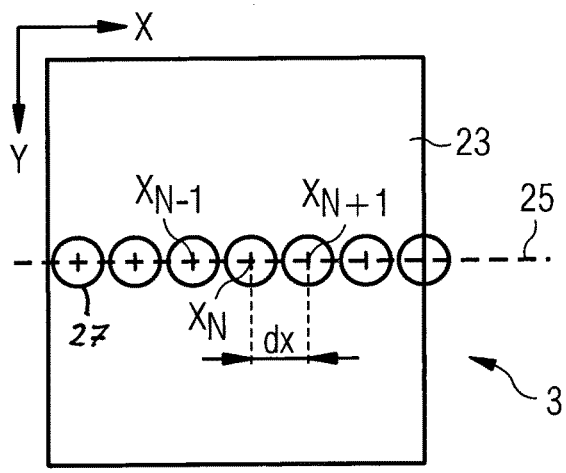
FIG. 5 is an exemplary illustration of a linear cutting path of single pulse interaction zones.

Referring to FIG. 5, the laser processing with laser processing system 1 is illustrated. FIG. 5 is a top view of a front face 23 of sample 3 being machined by irradiating laser pulses of a Bessel-like laser beam onto that front face. Sample 3 is scanned along a predetermined pre-cutting path 25 that extends, for example, along the X-direction.

The laser scanning is performed such that consecutive laser pulses irradiate different areas of front face 23 along pre-cutting path 25. In FIG. 5, circles 27 schematically represent the areas where sample 3 is irradiated by the core of the Bessel-like laser beam. Circles 27 have centers $X_{N-1}$, $X_N$, $X_{N+1}$, . . . that are separated by a distance dx and correspond to pre-cut positions. Accordingly, within each circle 27 a damage region extends and along the propagation axis Z and around the respective center of centers $X_{N-1}$, $X_N$, $X_{N+1}$. Exemplary spacing conditions may use a distance dx of at least 1 µm, at least 2 µm, or at least 4 µm, for example 2 µm, or a distance dx of at least 80% or at least 100% of a core beam waist at full width half maximum of a pulsed Bessel-like laser beam such that they are not too close to the previous laser damage zone as that may affect the present beam propagation and thus the quality of that laser damage region. A distance dx of 4 µm may allow for large speed and good quality of pre-cutting.

In some embodiments, the scanning is performed in a single pass scan. Single pass relates to the fact that each section along the cutting path is only visited (passed) once by the laser beam. Accordingly, a single laser pulse damage region (around center $X_N$) originating from a selected laser pulse has only a single directly neighboring single laser pulse damage region (around center $X_{N-1}$) that originates from a single laser pulses irradiated in time immediately before the selected laser pulse and one directly neighboring single laser pulse damage region (around center $X_{N+1}$) that originates from a single laser pulses irradiated in time immediately after the selected laser pulse.

In other word, the scanning is performed such that, during the single pass scanning, the pulsed Bessel-like laser beam does not return to an earlier irradiated position such that a single laser pulse damage region (around center $X_N$) originating from a selected laser pulse has only a single directly neighboring single laser pulse damage region (around center $X_{N-1}$) that originates from a single laser pulses irradiated in time immediately before the selected laser pulse and one directly neighboring single laser pulse damage region (around center $X_{N+1}$) that originates from a single laser pulses irradiated in time immediately after the selected laser pulse.

The first step of the material processing as disclosed in connection with FIG. 1 to FIG. 5 is referred to herein also as pre-cutting because—due to the limited extension of the damage regions after the pre-cutting along cutting path 25—there generally remains a structural connection between the sections of the material on the sides of cutting path 25. Remaining structural connections may generally also be present in the case that the damage regions extend from the front face (through which the laser beam enters the material) to the back face (through which the laser beam exits the material).

Several aspects of the disclosure herein refer to layered materials. An example of a layered material comprises at least one tensile stress layer, at least one compression stress layer, and at least one interface region between the at least one tensile stress layer and the at least one compression stress layer.

Figure 6:
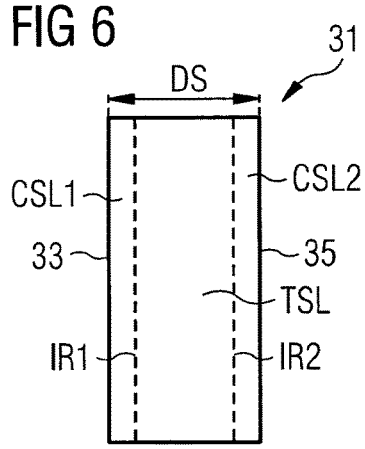
FIG. 6 is a schematic cross-section of a tempered glass plate.

In FIG. 6, as a specific example of a layered material, a tempered glass 31 of a thickness DS is schematically illustrated. Tempered glass 31 contains two compression stress layers, a front compression stress layer CSL1 at a front face 33 and a back compression stress layer CSL2 at a back face 35, as well as one tensile stress layer TSL there between. Accordingly, tempered glass 31 comprises two interface regions, an interface region IR1 between front compression stress layer CSL1 and tensile stress layer TSL and an interface region IR2 between tensile stress layer TSL and back compression stress layer CSL2.

Tempered glass is used as a substrate for display panel, safety window etc. because of its higher strength of, for example, the front surface as compared to non-tempered glass. In general, glass materials are tempered using chemically or thermally strengthening treatment causing the formation of a compression stress layer at the sample surfaces. The thickness if the compression stress layer may be in the range of, for example, 50 µm to 70 µm. The tensile stress layer may extend thus inside the material. Due to those stress layers, conventional cutting of tempered glass may easily results in irregular pieces. There herein disclosed methods, however, may allow cutting of tempered glass with a high quality cat-surface.

Examples illustrating the extension of the fluence above a threshold fluence for single laser pulse damging are disclosed in the following in connection with FIG. 7 to FIG. 13.

Figure 7:
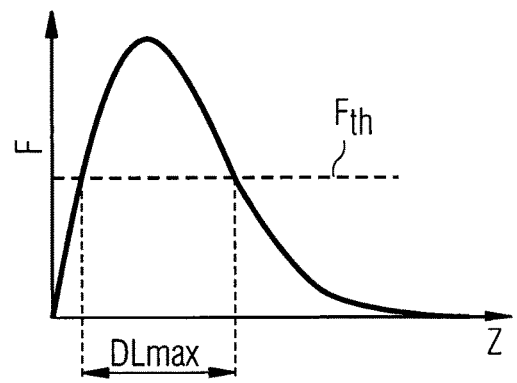
FIG. 7 is a schematic illustration of the laser induced damage length for Bessel beams.

Referring to FIG. 7, the variation of a fluence F of, for example, the core of the Bessel-like beam along propagation direction Z is schematically illustrated by a fluence graph 41. In addition, a maximum damage length DLmax in propagation direction Z is indicated in which peak fluence F is above a threshold value Fth for optical damaging, essentially it is assumed that this threshold value corresponds to the threshold of optical break down. Specifically, a fluence above threshold value Fth may cause optical break down and thereby modify the internal structure of the material, e.g. form a damage region or even ablation in which material is destroyed. It is assumed that although ablation is one type of laser induced damage other types such as modifications of the index of refraction, changes of the density or even hardness exist and may have the same effect to induce a symmetry for a cleaving process such that high quality cut faces originate that, for example, primarily extend within one plane, e.g. the or next to the plane of the laser induced damage regions.

Herein, a laser induced damage zone may be identified as the zone of the sample over which structures as a result of the laser interaction are observed after cleaving. Different types of structures may be present in different sections of the cut face as disclosed in connection with the SEM images shown in FIG. 22 and FIG. 23. Thus, laser induced damage zones may be seen, for example, in an optical microscopic image of a cut face as discussed below in connection with FIG. 16 to FIG. 18. In general, the length of the laser induced damage zone may be defined as the length of the sample section that shows damage in one plane (if the sample is scanned along X-direction, then in the XZ plane) and does not include any cracked section of the sample which is often related to the portion that is not pre-cut with the laser beam. The laser induced damage region is herein considered as the region of the un-cleaved material in which some material modifications where caused by the interaction with the high fluence of the irradiated laser beam.

In general, the extension (length) of the laser induced damage region and laser induced damage zones correspond to each other and is herein referred to as laser induced damage length DL such as the maximum laser induced damage length DLmax indicated in FIG. 7. Moreover, for linear translation movements, single laser pulse damage regions of successive laser pulses are parallel with respect to each other and extend—for a pure lateral translation movement—essentially over the same laser induced damage length.

In general, the interaction of a single pulse of, for example, such a Bessel-like beam with a material being essentially transparent with respect to single photon absorption of the laser beam when propagating through the material may be based on multi-photon ionization. Multi-photon ionization may be accompanied by electron avalanche photoionization and result in a single laser pulse damage region. The length of the single laser pulse damage region may be within a range of several 100 µm up to 1 mm and more in direction of the laser beam propagation and the width may be within a range below about 2 µm in radial direction. The extension of the single laser pulse damage region depends on the field strength within the focus of, for example, the core beam and, thus, depends on the optical beam path within optical system 7 and the laser characteristic of the pulsed Bessel-like laser beam such as the laser pulse energy and the laser pulse duration provided by laser system 5.

For high intensities, ablation of material (be it on the surface or within the material) may dominate. For lower intensities, a modification of the material itself (its inner structure) may occur, e.g. a modification of the hardness or the index of refraction due to changes on the atomic structure.

Transparency with respect to single photon absorption corresponds to the fact that single photon absorption is not the underlying ionization process as, for example, the band gap is larger than the photon energy. Ionization based on multi-photon ionization is generally characterized by an ionization threshold such that also the formation of a damage region is well defined in space. For example, the material may be transparent in the near infrared and/or visible spectral range When performing the pre-cutting of the material, the position of the sample with respect to the laser beam may be maintained in such a way that the condensed beam zone (the volume in the space where the fluence (J/cm2) of the laser beam is above ½ of the maximum fluence) is positioned either across one of the sample face. Then, the fluence will be the highest, for example, at the sample's front face or the sample's back face. Alternatively, the condensed beam zone may be positioned completely within the sample such that the fluence is below the threshold fluence or even zero at the sample faces.

Figure 8:
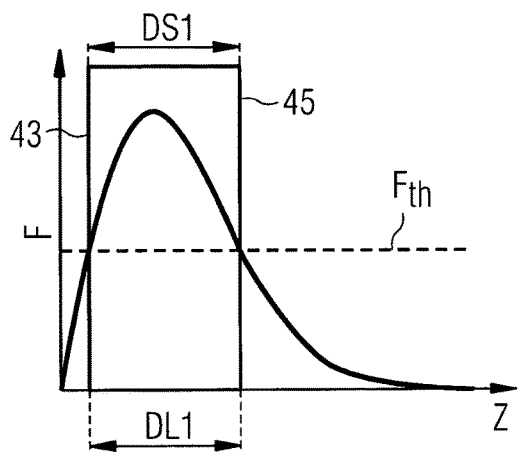
FIG. 8 is an exemplary illustration of a centered focusing with respect to a glass plate.

The later position of the sample is illustrated in FIG. 8 for a material of a thickness DS1. FIG. 8 shows a focusing geometry where the zone of laser induced damage has at least a length DL1 that extends through the entire sample in propagation direction Z, i.e. at least DL1=DS1. In this case, the laser induced damage is connected both to a front face 43 and a back face 45 of the sample.

For a layered glass as shown in FIG. 6, the focusing position of FIG. 8 ensures that all stress layers as well as all interface regions are pre-cut.

Figure 9:
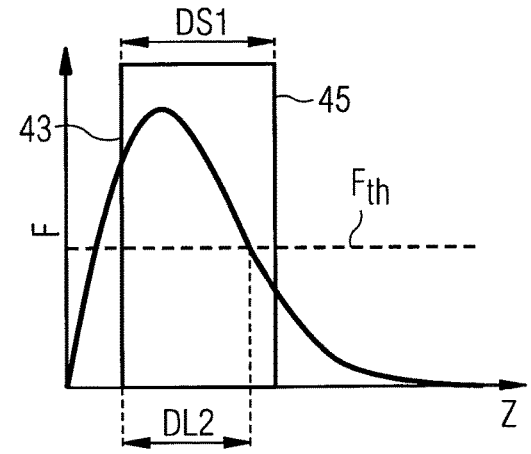
FIG. 9 is an exemplary illustration of a front side shifted focusing with respect to a glass plate.

FIG. 9 illustrates a focusing position for the material of thickness DS1, whereby only front face 43 is subject to an above threshold fluence. Correspondingly, a zone of laser induced damage of a length DL2 is formed inside the material, which has a length that is smaller than the thickness DS1. In contrast to the focusing geometry shown in FIG. 8, the zone of laser induced damage is connected only to front face 43 but not to back face 45.

For a layered (for example, tempered) glass as shown in FIG. 6, the focusing position of FIG. 9 provides only that front compression stress layer CSL1 and only a part of tensile stress layer TSL including interface region IR1 are pre-cut if the difference between thickness DS1 and length DL2 is larger than the thickness of the back compression stress layer CSL2.

Figure 10:
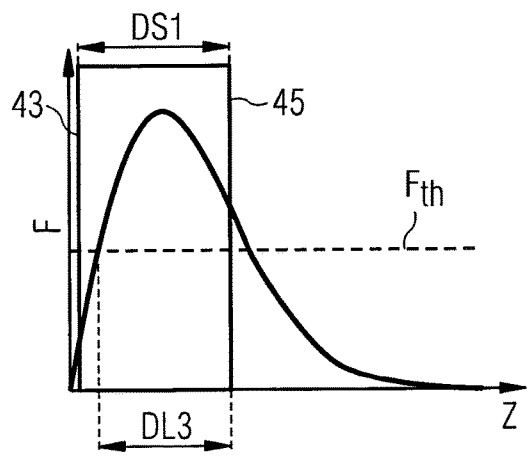
FIG. 10 is an exemplary illustration of a back side shifted focusing with respect to a glass plate.

Similarly, FIG. 10 illustrates a focusing position for the material of thickness DS1, whereby only back face 45 is subject to an above threshold fluence, i.e. in contrast to the focusing geometries shown in FIG. 8 and FIG. 9.

For the tempered glass of FIG. 6, the focusing position of FIG. 10 provides that only a part of tensile stress layer TSL and (the complete) back compression stress layer CSL2 including interface region IR2 are pre-cut—in particular, if the difference between thickness DS1 and length DL3 is larger than the thickness of the compression stress layer CSL1.

Figure 11:
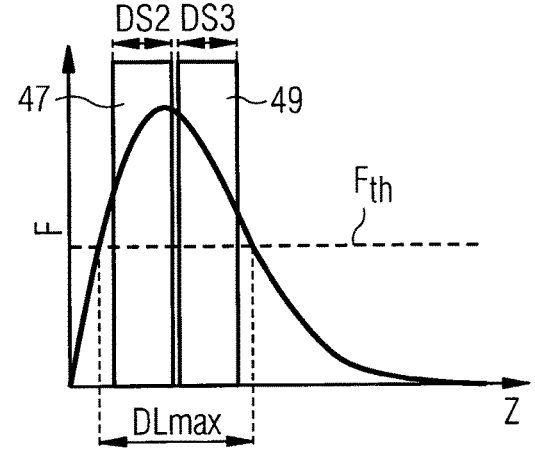
FIG. 11 is an exemplary illustration of a focusing applied to a pair of glass plates.

Referring to FIG. 11, pre-cutting of a stuck of two plate-like samples 47 and 49 is illustrated as an example of simultaneous multi-material processing. In the example of FIG. 11, the samples of, for example, tempered glass have thicknesses DS2 and DS3 and the maximum length of the laser induced damage DLmax is greater than the total thickness of the two samples, DLmax>DS2+DS3. The embodiment of FIG. 11 illustrates that for a sufficient long induced damage length DLmax it may be possible to pre-cut multiple material plates at the same time.

Figure 12:
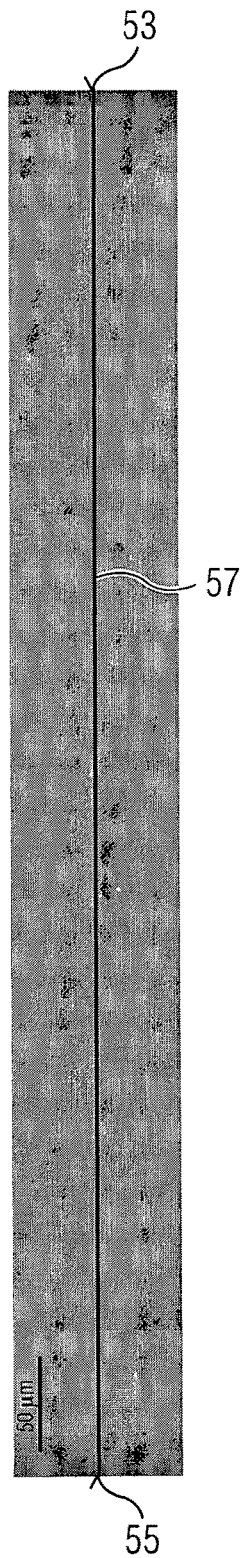
FIG. 12 is an optical micrograph of a tempered glass in side view (uncleaved)
Figure 13:
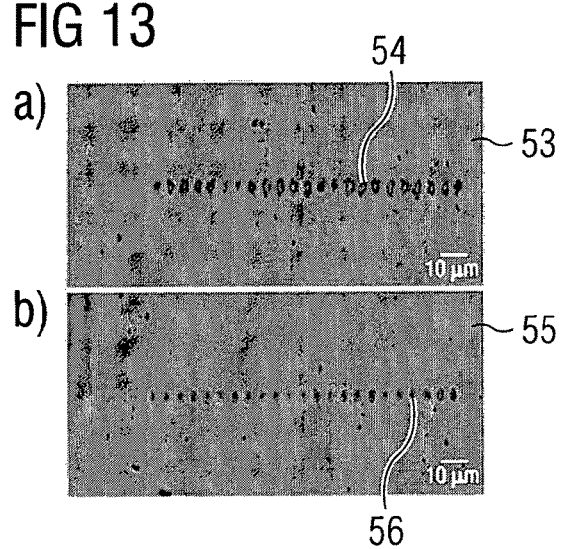
FIG. 13 is an optical micrograph of a front surface (a) and a back surface (b) of the tempered glass shown in FIG. 12.

FIG. 12 and FIG. 13 further illustrate the focusing position of FIG. 8. Specifically, FIG. 12 shows a side-view optical micrograph of a pre-cut tempered glass having a thickness of 700 µm. The laser pre-cutting was performed with a Bessel-like beam of a conical half-angle of 9°, a laser energy per pulse of 72 µJ, and a laser pulse duration of 11 ps. The distance dx between consecutive interacting laser pulses was 4.5 µm. The tempered glass is not yet separated such that the single laser pulse damage regions are maintained in tact and can be seen from the side. The laser induced damage regions extend throughout the tempered glass. The optical micrograph shows a front face 53 and a back face 55 each showing darkened spots where the laser beam entered and exited the tempered glass. The top view of FIG. 13(a) of front face 53 and the top view of FIG. 13(b) of back face 55 clearly indicate the single pulse interaction areas (damage areas 54 in front face 53 and damage areas 56 in back face 55) along the cutting path.

Referring again to FIG. 12, the side view shoes linearly extending darker lines one of them being enhanced for illustration purposes that extend from front face 53 to back face 55 across the tempered glass and clearly illustrate the long ranging of laser induced damage regions 57 within the tempered glass.

Figure 14:
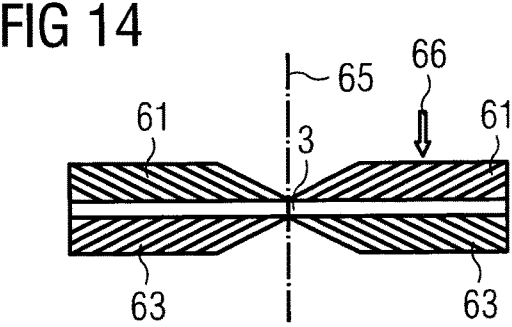
FIG. 14 is an illustration of an exemplary preparation step for cleaving pre-cut material.

In the following, the second (separation) step of the material processing is disclosed in connection with FIG. 14 and FIG. 15. Mechanical separation of parts of the material by, for example, applying pressure using a custom-designed apparatus is achieved. It is noted that, in some embodiments, internal stress within the material may, however, initiate a spontaneous separation of the material in separate parts.

Following the pre-cutting step, the material may be separated by applying a forth across the cutting path. FIG. 14 and FIG. 15 illustrate in a simple way an exemplary separation step based on a mechanical arrangement. Specifically, according to FIG. 14, the front face and the back face of the pre-cut sample are covered with pairs of cover plates 61 and 63, respectively. The pairs of cover plates 61 and 63 are configured such that the cutting path is the preferred line of breaking. For example, cover plates 61, 63 are weakened along the cutting path position as shown in FIG. 14 by featuring a low-angle of, for example, 15° cone-shaped tips. Cover plates 61, 63 may be made of a hard material such as aluminum. An exemplary placement of all four cone-shaped tips is shown FIG. 14. A dashed-dotted line 65 shows the normal to the cutting path, corresponding to the propagation direction of the laser beam.

In some embodiments, a soft, sponge-like material (for example, compressible to a few hundred microns, not shown) may be placed as shock absorbers between sample 3 and cover plates 61 and 63. The separation may be performed by holding one of the sandwiched sides of sample 3 (e.g. the side on the left of FIG. 14) and applying a force 66 in direction of the arrow, for example, in parallel to dashed-dotted line 65 at the center of the other side of the sample.

Figure 15:
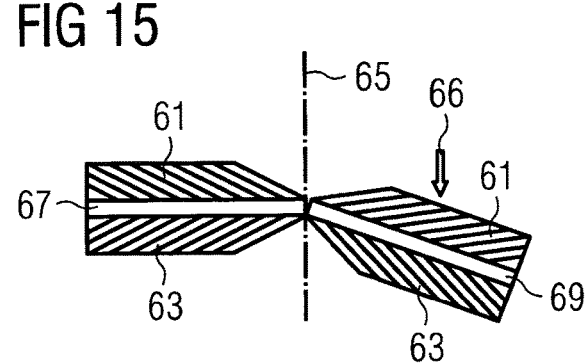
FIG. 15 is an illustration of an exemplary cleaving step.

FIG. 15 illustrates the breaking movement where sample 3 is broken into parts 67 and 69.

The direction of breaking (i.e. applying of the pressure) may be important when the laser induced damaged region does not cover the whole sample. The direction of breaking may be chosen such that the surface to which the laser induced damage region connect would open first. In embodiments in which the laser induced damage regions cover both surfaces of the sample, the direction of breaking may be not important and the pressure may be applied to either side.

Figure 16:
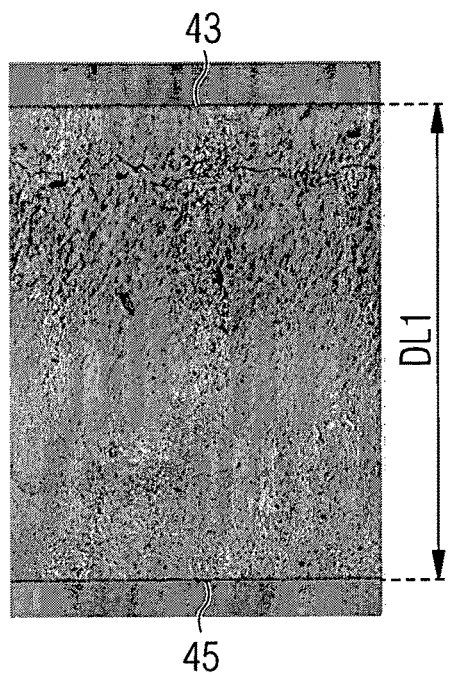
FIG. 16 is an optical micrograph of a side view of a tempered glass after cleaving without crack formation.
Figure 17:
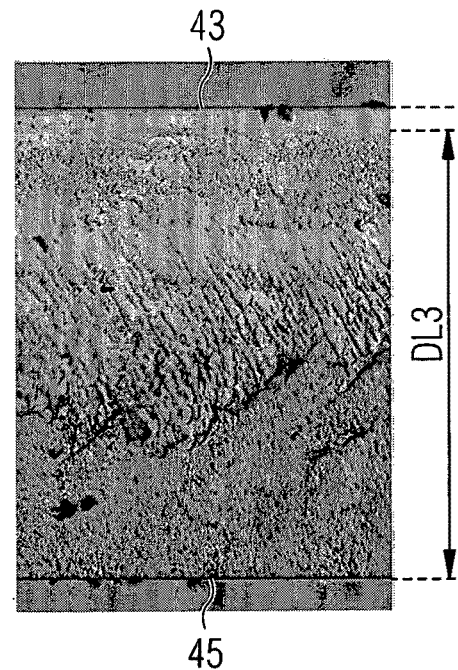
FIG. 17 is an optical micrograph of a side view of a tempered glass after cleaving without crack formation.
Figure 18:
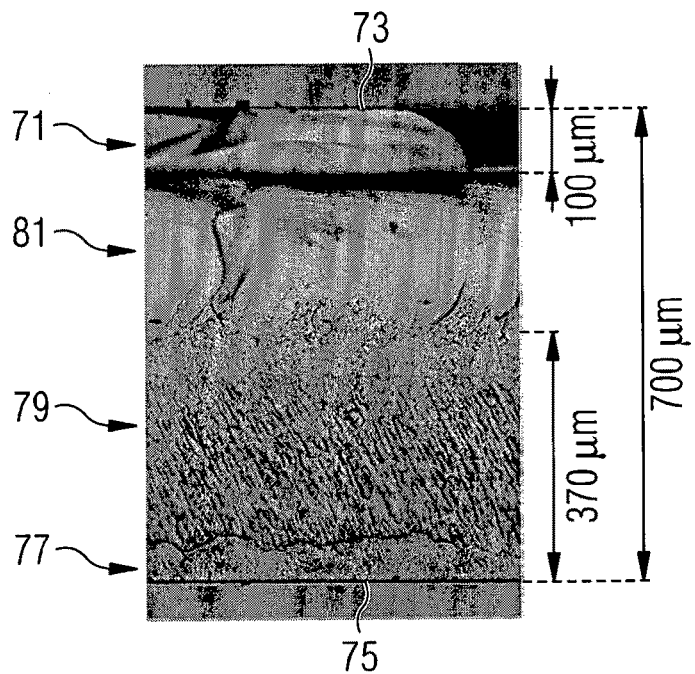
FIG. 18 is an optical micrograph of a cross-section of a tempered glass after cleaving with large crack formation.

A laser induced damage zone may be visualized by optical microscopy. Exemplarily, FIG. 16 to FIG. 18 show side view optical micrographs for different extension and positioning of the laser induced damage zone. The quality of the cut for experimental tests on a tempered glass of thickness 700 µm is illustrated. The cut quality is inter alia defined by the crack depth next to the front face/back face and depends on the length of laser-induced damage region and the focusing geometries illustrated in connection with FIG. 8 to FIG. 10. The pre-cutting was performed with Bessel-like beams of conical half-angle 9°, pulse duration of 11 ps and an inter-pulse spacing of 2 µm.

Specifically, FIG. 16 shows a cross-sectional optical micrograph showing the machining surface without any crack. The focusing geometry in this case is similar to that shown in FIG. 8 such that laser induced damage zone (length DL1 of 700 µm) extends across the complete thickness of the tempered glass, i.e. from front face 73 to back face 75.

In FIG. 17, the pre-cutting corresponds to a focusing geometry similar to that shown in FIG. 10 but still in an operating regime classified as region II in FIG. 21 (discussed below) as the condition DL>CSL+TSL is satisfied. No cracks are present within the compressed stress layers. It is noted that, when the laser induced damage zone covers nearly 70% of the sample from the back face, one also may observe ablation/damage on the front face because the damage threshold for a surface is lower than for the bulk of any transparent material.

In FIG. 18, a cross-sectional optical micrograph of tempered glass processed by pre-cutting and cleaving is shown where the Bessel-like beam position with respect to the sample's front face 73 is set similar to the position illustrated in FIG. 10. However, the laser induced damage zone was set to be only 370 µm and thus slightly larger than 50% of the thickness of the tempered glass.

In FIG. 18, a cracked region 71 having a thickness of about 100 µm can be seen adjacent to front face 73. At back face 75, there is a region 77 that looks like polished and has a pattern that represents the high quality cut due to the laser pre-cutting. Next thereto is a region 79 having a pattern created by the cleaving process still within the plane of region 77, thus being of high quality. Specifically, length DL3 of about 370 µm corresponds to regions 77 and 79 and is less then the sum of the thicknesses of compression layer CSL2 and tensile layer TSL. Between region 79 and crack region 71, there is another region 81 with a unique pattern which may be attributed to uncontrolled cleaving being not affected by the pre-cutting and being not in the plane of the pre-cutting such that region 81 corresponds to lower quality cutting.

The roughness in crack region 71 and region 81 may be significantly larger than the surface roughness of the pre-cutting affected regions 77 and 79, which may be in the range of only a few microns or even in the submicron range.

The presence of the differing regions in FIG. 18 may be typically observed when the laser induced damage zone does not cover a sufficient length along the thickness. In particular, the differing regions of FIG. 18 may be due to the fact that length DL3 of the laser induced damage zone is not long enough to provide a symmetry for the cleaving process over the complete thickness.

Nevertheless, the conditions of FIG. 18 still may allow a sufficient cleaving of pre-cut tempered glass as the interface region between compression layer CSL2 and tensile layer TSL is subject to the laser damage region.

With respect to FIGS. 16 to 18, the laser induced damage zone was defined as the zone of the sample over which regular damage patterns are observed as evident from the optical microscopic image. Note here that one may define the length of the laser induced damage zone as the whole length of the sample that contains damage in one plane (if sample is scanned along X-direction, then in the XZ plane) and, thus, does not include the cracked portion(s) of the sample and the portion that is not machined using laser.

Figure 19:
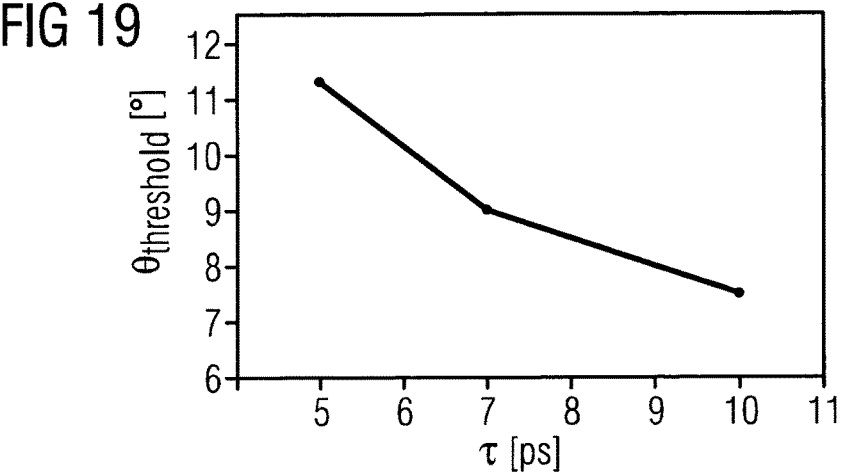
FIG. 19 is an exemplary illustration of the dependence of a damage threshold conical half-angle of the Bessel beam from the laser pulse duration.
Figure 20:
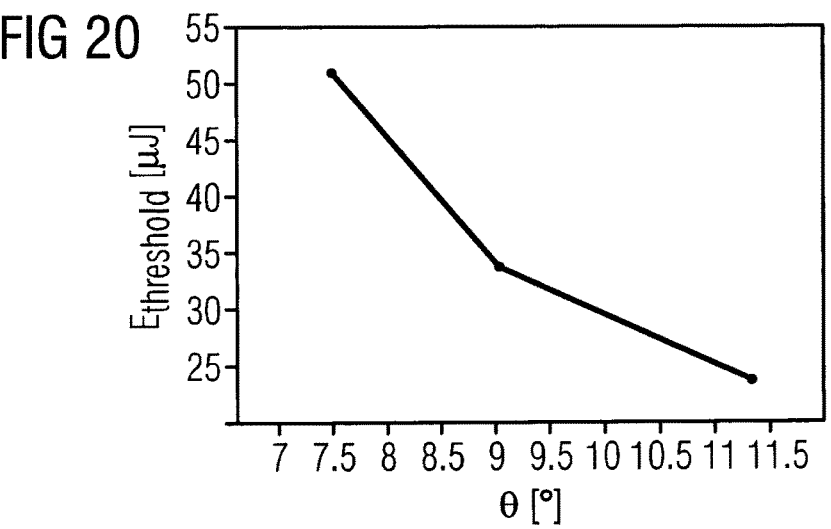
FIG. 20 is an exemplary illustration of the dependence of a damage threshold laser pulse energy from the conical half-angle of the Bessel beam.
Figure 21:
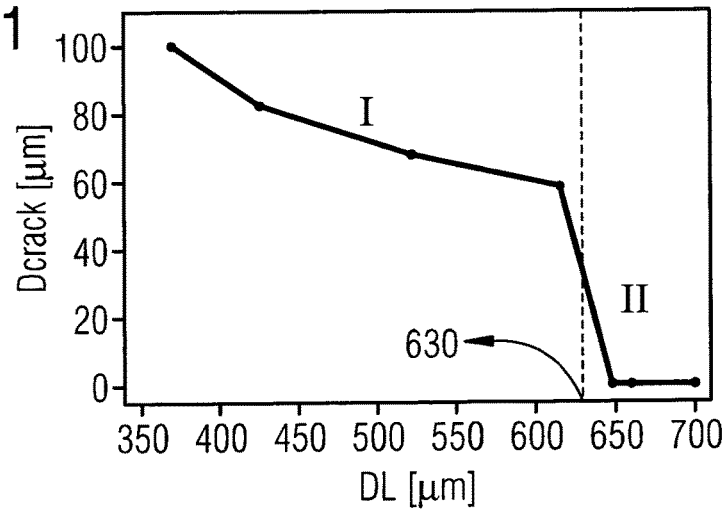
FIG. 21 is an exemplary illustration of the dependence of a crack depth from a laser induced damage length.

FIG. 19 to FIG. 21 illustrate various experimental data. Referring to FIG. 19, for the focusing geometry of FIG. 10, the dependence of the minimum conical half-angle θ of a Bessel-like beam that can induce damage in tempered glass from the laser pulse duration τ is shown. The distance dx between adjacent damage zones was about 2 µm. For smaller conical half-angles, longer pulses are required.

Referring to FIG. 20, for the focusing geometry of FIG. 10, the dependence of the minimum laser energy E (in µJ) that can induce damage in tempered glass from the chosen conical half-angle θ of the Bessel-like beam is shown. The threshold laser energy was determined by pre-cutting tempered glass of 700 µm thickness with laser pulses of 11 ps pulse duration. The distance dx between adjacent damage zones was about 2 µm. The threshold energy was defined as the minimum energy (for a particular conical half-angle) which causes the laser induced damage zone to be sufficiently long enough for pre-cutting of the tempered glass.

Referring to FIG. 21, for the focusing geometry of FIG. 10, a tempered glass of thickness 700 µm, a laser pulse duration of 11 ps, and a Bessel beam of conical half-angle of 9°, the dependence of a crack depth Dcrack from the front face from the length DL of the laser-induced damage zone is shown. The distance dx between adjacent damage zones was about 2 µm. In FIG. 21, a region I has been indicated in which cracks appear on the compression stress layer CSL1 at the front face of the tempered glass.

Region I essentially corresponds to the focusing geometry in which the laser induced damage length DL is smaller than the combined thicknesses of one compression stress layer and one tensile stress layer.

A region II corresponds to the focusing geometry in which the laser induced damage length DL is larger than the combined thicknesses of one compression stress layer and one tensile stress layer. In region II, no cracks appear; even if the laser induced damage length DL is smaller than the combined thicknesses of two compression stress layers and one tensile stress layer, i.e. even if the sample is thicker than the laser-induced damage zone.

Based on the above, it has been identified that the (minimum) needed energy per pulse depends mainly on the sample thickness and may be in the range of, for example, 1 µJ to 40 µJ per 100 µm thickness, for example 2 µJ to 20 µJ/per 100 µm thickness (such as 5 µJ per 100 µm thickness) depending inter alia on the material and laser spectrum but weakly depending on the chosen cone angle or the set pulse duration. This can be seen with coarse approximation from the combination of FIG. 19, which teaches that for longer samples, i.e. smaller angles, longer pulses are needed, and FIG. 20, which states that pulse energy increases with increasing the pulse duration.

However, having the correct energy per pulse is not sufficient for achieving single-shot pre-cutting. In fact, if it happens that both pulses are short and the cone angle is small, then single-shot pre-cutting is prevented. However, then the single shot pre-cutting regime may be reached by increasing the pulse duration and/or the cone angle. Note that, in order to increase the cone angle and being at the same times able to keep the same sample length one may further also need to increase the beam size (e.g. by increasing the beam apodisation function of the Bessel-like beam) so that the same Bessel zone is guaranteed. It is noted that, since this operation is performed at fixed energy, the average energy density decreases. However, as it is observed in practice, that this does not affect the cut capability, since the Bessel-like beam core has a smaller size and, within reasonable angle range, the fluence is still above the threshold for modifying the material and performing thereby acceptable pre-cutting.

Increasing the cone angle requires increasing beam diameter and, thus, the size of the optical elements, which might be costly. In contrast, increasing pulse duration may simply require chirping the pulse, which is easily feasible for fs or ps laser pulse durations. Moreover, since ps lasers are usually cheaper than fs, it is proposed to use ps (not fs) laser systems for single-shot pre-cutting of thick samples (for example thicknesses in the range from 0.5 mm to 1.5 mm).

In other words, it was discovered that on increasing the pulse duration (thus reducing the cost) the minimum cone angle that is necessary for single-shot cut decreases. This allows, for a fixed sample length, smaller beams and smaller optics and, thereby a cheaper and more easily to handle set up. Surprisingly, going for longer pulses does not demand for larger laser pulse energy (or average powers). Indeed, if one looks carefully at the data, the minimum energy may even slightly decrease. Therefore, for example a ps pulse duration (for example in the range from 5 ps to 15 ps such as 10 ps) is proposed for "cheap" but high quality single-shot pre-cutting.

Figure 22:
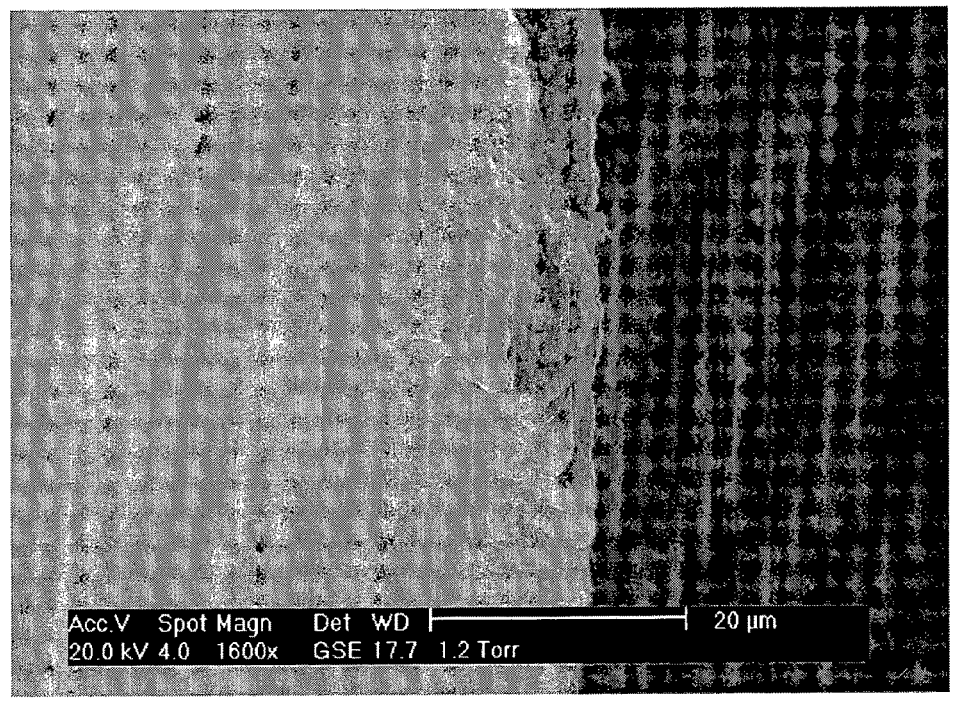
FIG. 22 is an SEM image of a corner of a pre-cut and cleaved face of a tempered glass part.
Figure 23:
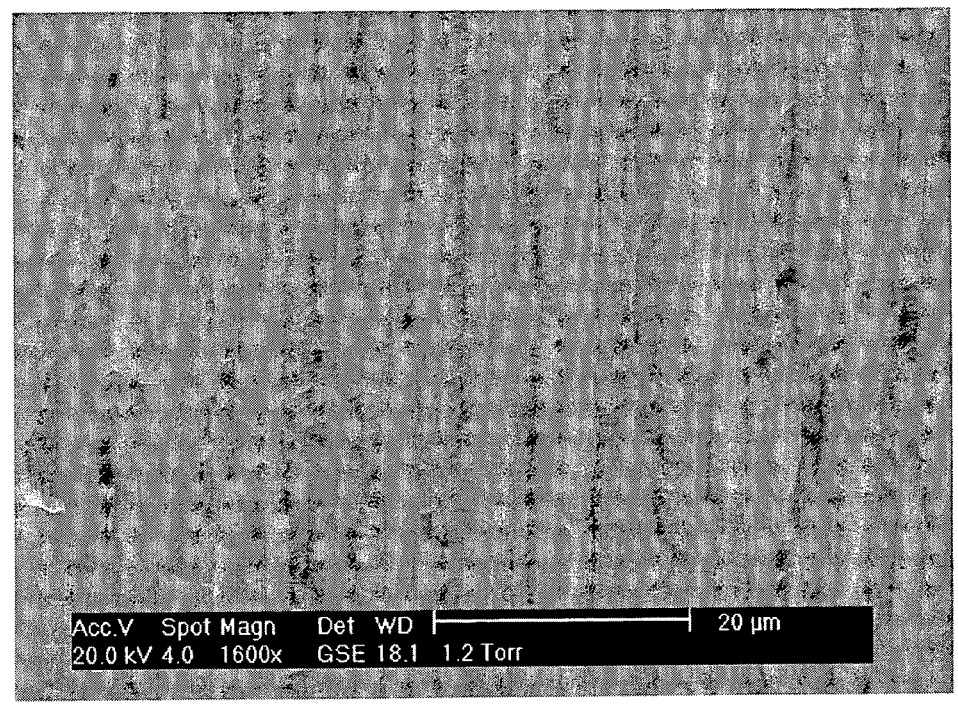
FIG. 23 is an SEM image of a middle portion of a pre-cut and cleaved face of a tempered glass part.

Referring to FIG. 22 and FIG. 23, SEM images of a pre-cut and cleaved part of a tempered glass with a thickness of 540 µm are reproduced. In FIG. 22, a corner of the pre-cut and cleaved part shows regular surface structure at the cut face. Specifically, a series of parallel half-pipes are formed and extend from the front face on along the cut face. In FIG. 23, a middle portion of the pre-cut and cleaved part is shown. The surface structure relates to a different section of the cut face with different types of structures. Specifically, the surface structure remains to extend in parallel. However, in addition to half-pipe structures also half-cylinder-like protruding shapes can be identified.

Referring to FIGS. 22 and 23, surface roughness in the range below 30 µm, for example, below 1 µm such as about 0.5 µm were achieved.

In some embodiments, the parameters for pre-cutting are set in order to reduce the time necessary for the laser pre-cut as described above, and thus to improve cutting speed. To this end, the distance between neighboring elongated damage regions may be increased. For example in some embodiments of a single pass scan, the pre-cutting may be performed for neighboring elongate damage regions such that the neighboring elongate damage regions are displaced with respect to each other by a distance of at least 1 or at least 2 µm or at least 3 µm or at least 4 µm. Naturally, the larger the distance between neighboring damage regions is, the greater is the force (external or internal) that may be required after the completion of the pre-cut laser process for the cleaving/separation of the parts. Usually, there is an upper limit of distance above which the neighboring damage regions do not sufficiently provide for a cleaving/separation process with a sufficient quality of the cut surface. Those limiting distances depend on the thickness of the material and are in the range from 2 µm to 50 µm such as in the range from 4 µm to 10 µm.

In some embodiments, the parameters for pre-cutting may be set in order to minimize the effort necessary for separating the cut parts of the material after the pre-cut is completed. As previously pointed out, this may even initiate spontaneous separation, i.e. where no external (mechanical) force is necessary at all. Depending on, for example, the density and extension of the damage regions as well as the material properties, spontaneous separation of the cut parts may take place. Preferably it takes place after the pre-cutting process is completed for that section that should spontaneously separate, e.g. 10 s or 5 s after, or even 1 s after completion or less. To this end, smaller distance between neighboring elongated damage regions may be selected, for example a distance smaller than 10 μm or 5 μm or 2 μm or 1.5 μm, or even smaller than 1 μm in combination with a respective extension of the laser damage region in laser propagation direction such as 50% or more up to even extending completely through the material.

Furthermore, the inventors noticed that, for any set of laser pulse parameters (including pulse duration, cone angle, pulse energy, and beam apodization), there exists a crossover distance, dcross, for which neighboring damage regions are not independent anymore. For example, if the distance between neighboring elongated damage regions is taken smaller than the crossover distance dcross, then the two damage regions are not independent anymore in the sense that the shape of the volume of the second damage region depends on the presence of the first.

Exemplarily, considering the case of radially symmetric beams, e.g. of Bessel-like beams, each beam typically forms—in the absence of any neighboring beam—a radially symmetric damage zone. However, if the second beam is positioned sufficiently close to a neighboring damage region, the presence of that damage region, and potentially the presence of the related stress in the material, may cause the second beam to perform a damage which is elongated not only along the Z direction, as for the independent damage regions, but also relative to the neighboring damage region. For example, a deformation may occur along the direction which connects the two damage regions (exemplarily referred to as X direction in FIG. 5).

In other terms, the shape of the volume of the second pulse damage region is not cylindrically but is that of a 3D ellipsoid with the shorter axis along a Y direction, being the direction perpendicular to X and the laser propagation direction Z.

The inventors have further noticed that the appearance of such elongation of the damage zone in the X direction may not be simply due to an artefact caused be the fact that two portion of two neighboring damaged zone are overlapping. In some cases, the damage elongation along the X direction relative to the neighboring damage region protrudes not only in the direction toward the first neighboring damage region but also in the direction away from the neighboring damage region.

It is even further assumed that the previous created damage region may be effected in a similar manner by the interaction with the following pulse.

The observed phenomenon may be interpreted as a consequence of the fact that the second pulse induces a stress in a material which is already stressed by the effect of the first pulse. The superposition of the two laser-induced mechanical stress produces inside the material a pressure whose larger value is naturally oriented along the direction at which both the pulses contribute, e.g. along the Y direction. As a consequence the material damage zone (e.g. the volume region inside the material where, e.g., the refractive index is changed, or micro cracks are formed, etc.) may feature the largest extension in the plane orthogonal to that force, here in the XZ plane. This circumstance is particularly relevant because it may allow, when a sequence of many pulse along a cut line is considered, to form not a series of independent damage cylindrical volumes but, moreover, the formation of a quasi-continuous or virtually continuous damage surface, which widely extends in the XZ plane (being planar or bent depending on the line of pre-cutting, i.e. depending on the positioning of the series of damage regions).

Figure 24:
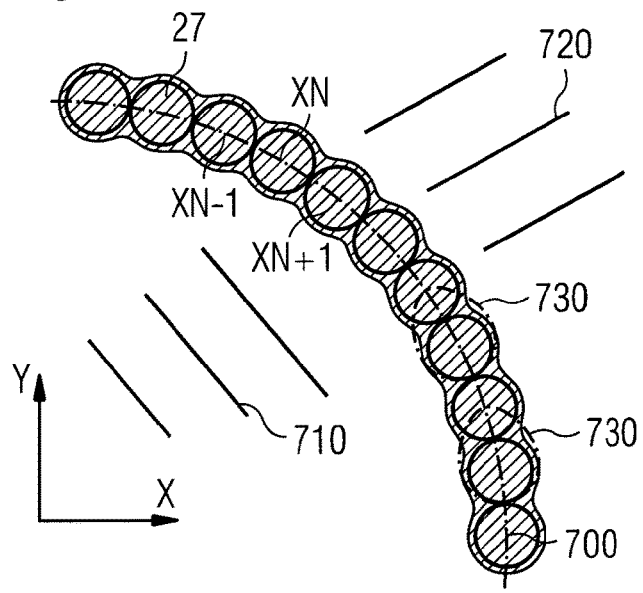
FIG. 24 is an exemplary illustration of a bent cutting path of single pulse interaction zones with a closeness affecting their shape.

FIG. 24 illustrate the above effect of deformation of the elongate damage zone due to the close presence of an existing elongate damage region. Specifically, FIG. 24 shows a series of locations XN−1, XN, XN+1. As an example, the series is positioned on a bent shape on the surface of a material plate such as a glass plate, exemplarily a section of a circle shown as a dashed separation line 700. Separation line 700 separates, for example, a cell phone screen 710 in the region of a corner from an outer section 720. In this example, cell phone screen 710 does not have any elongate damage regions in its inner region. Also outer section 720 of the material does not have any damage regions such that a separation will take place only along separation line 700 (usually with a variation of the surface in the range of the damage zone extension in lateral direction at least for those regions were elongate damage regions were provided; according to the embodiment of FIG. 24 continuously along the line and, for bent boarders, usually across essentially the complete material thickness).

Moreover, FIG. 24 illustrates for each location XN−1, XN, XN+1 a circle 27 in analogy of FIG. 5 and an elliptical shape in grey scale. To more clearly illustrate the elliptical deformation of the elongate damage region, two elliptical shapes 730 are indicated with a surrounding dashed line. For the specific example of FIG. 24, the deformation is in the direction of the neighboring, already existing elongate damage region. The size and shape are only schematically indicated to illustrate the deformation in the XY plane, e.g. in the surface plane of the sample.

As shown in FIG. 24, the elongate damage regions extend about 1.5 times more in the direction of the scan, i.e. the separation line 700, than in lateral direction thereto. As will be appreciated, the symmetry break may influence the breaking separation process in particular in the case of a bent separation line by guiding the separation process (crack formation is "bent" around the corner).

Moreover, for small displacement also the form of the previous elongate damage region may be affected such that a widening of the same in direction of the scan may occur (not shown in FIG. 24).

Moreover, the resulting closeness of the elongate damage regions (even up to formation of a continuous damage region) further may support the spontaneous separation of cell phone screen 710 and outer section 720.

The laser processing to generate a self-separating damage surface is herein not considered to be a cut because the two portions of the material are not separated at once, as for the case of an ablation line in which the material connecting said two portions is removed. In contrast thereto, the herein disclosed separation of the parts may occur on itself only after the laser processing is completed, for example, after a complete separation line is processed by the laser pulses. Exemplary completed cutting lines may feature both of the start point and the end points on the material perimeter and/or may feature structures having overlapping start and end points and/or may feature sections of material that are removed.

The separation process (and thus the completion of the cutting in the sense of the above discussion) may be performed afterwards, e.g. by cleaving, such as by applying an external force. This separation process may be applied, for example, in cases in which neighboring damage regions are well separated. However, as described above the separation may also occur spontaneously after the pre-cut is completed, if the damage surface in the XZ plane is large enough, and/or if the accumulated internal stress due to the pre-cutting action is large enough. The occurrence of such spontaneous separation may be understood as a consequence of a large amount of stress produced inside the material by the laser interaction and by the fact that said stress may be released when the two parts of the material eventually separate. Note that, in order to prevent breaking of the material along lines different from the separation line, it is important to tune the laser parameter such that excessive stress is preferably not accumulated. Preferably the parameters are set such that spontaneous separation is not initiated before the pre-cut is completed. If spontaneous separation may start before the separation line is completed, random breaking may occur in particular in those regions in which the pre-cutting has not been performed.

In line with the above, in certain embodiments, the distance between neighboring damage regions is selected to be sufficiently small to ensure that the shape of the damaged volume relative to any pulse is that of a 3D ellipsoid having the shorter axis orthogonal to the separation line, e.g. in the Y direction in FIG. 5. In some embodiment, the extension of the damage region in the X axis is for example 1.2 times, preferentially 1.5 times or more, such as 2 times larger than the extension in the Y axis. For the foregoing consideration, it is referred to the smallest ellipsoid circumscribing the damaged region.

In some embodiments, laser parameters may be tuned so that, if the laser pre-cut is interrupted at any point after the first and before reaching the sample perimeter or the starting position, then the shape of the damaged region relative to the neighboring pulse extends along scanning direction, e.g. along the X direction in FIG. 5, away from the damage of the neighboring pulse more than along the direction orthogonal to the separation plane (e.g. the Y direction being orthogonal to the XZ plan in FIG. 5), e.g. 1.2 times more or 1.5 times more or 2 times more.

In some embodiments, the separation of the pre-cut portions of the material may be initiated by creating a thermal stress by means of a temperature gradient induced between the top and bottom material surfaces. For example, one may induce a gradient of 1° or more, such as 3° or more, for example 10° across the material in thickness direction. In some embodiments, the temperature gradient may be produced by blowing warm or cold air onto one side of the material, or by causing evaporation of humidity from one of the material's surface side.

In some embodiments, a temperature gradient might be induced between the external surfaces and the inner bulk material, for example, by a fast external cooling or heating process of both sides.

In a further embodiment, the separation of the pre-cut portions of the material may be initiated by acoustic waves such as using ultrasonic waves (e.g. at a frequency in the range above 17 KHz, preferably above 19 KH, more preferably above 20 KHz, and power in the range for 10 W to 1000 W, preferably from 50 W to 500 W, more preferably from 100 W to 300 W. Furthermore referring to spontaneous separation, Bessel-like beam cutting technology may be configured as a single step tempered glass cutting technology, without the need of mechanical cleaving. Only a single processing step, e.g. pre-cutting to provide self-breaking conditions—sometimes with a plus simple second tension increasing step (heating, blowing, condensation cooling etc.) may be achieved. Tension between the tempered layers may be used as a self-breaking force separating the pre-cut material. Self-separation enables arbitrary shapes of the cut, e.g. round cuts as shown in FIG. 24.

For example, tempered glass may be cut without the mechanical cleaving step if the material between tempered layers, including the tempered layers, is damaged by laser interaction in such a manner that the stress occurring due to the tempered layers is large enough to break the material apart along the separation line formed by the pre-cutting process. In some embodiments, break initiation may be applied by laser or by a temperature difference between the material surfaces.

Under certain conditions the second step performing the mechanical cleaving may not be necessary. In some configurations, the laser pulses are delivered closer to each other along the separation line and damage is provided to an extend that, for example, a temperature differences induced between top and bottom of the sample is sufficient or that the separation is even self-starting. The timing may even be set to a specific time difference to allow the material to be transported out of the pre-cutting system.

Exemplarily, this may result in cleaving appearing spontaneously after one or two minutes, or in a few seconds after blowing air on the sample. Cleaving might also be initiated by applying a slight initial separating force between the two parts to be cleaved.

As described above, the self-separation approach may be used for tempered glass but also for un-tempered glass such as sapphire. Although, for a material with high tempering the configuration for self-separation may be easier to be set. Moreover, multi-scanning approaches (as disclosed herein) may become necessary if the laser parameters do not allow to provide the required extension of the damage regions within the separation line.

A particular advantage of the self-separation approach is the above described application to curved separation lines. A mechanical initiated breaking process may be more prone to low quality separation planes or cracks extending into the material.

In some embodiments, for self-separation, the elongate damage regions may need to extend from one side to the other (or at least over 90% of the thickness). This may in particular be the case for self separation along bent separation lines.

In the following several procedures are exemplarily disclosed that aim to provide specific solutions to various situation:

Procedure A

In procedure A, the laser and scanning parameters are set so to ensure that spontaneous breaking does not occur during the pre-cut phase and occurs a few seconds after the completion of the pre-cutting phase, e.g. about 10, 5, 1 s after the completion. Laser parameter include, for example, at least one of the cone angle, the pulse duration, the beam apodization, and the pulse energy. The setting of the parameters can be performed as described herein based on the thickness of the material such that the required high quality and high speed of the pre-cut are ensured. Scanning parameters include, for example, the distance among neighboring elongated damage regions within the separation plane; for example, the distance is taken in the range extending up to 4 μm, or up to 2 μm, or up to 1.5 μm, or even up to 1 μm. In some embodiments, the distance is taken to be sufficiently small to guarantee that the shape of the damage volume for any pulse is that of a 3D ellipsoid having the shorter axis in the orthogonal to the scanning direction, e.g. the Y extension of the 3D ellipsoid is at least 1.2 times, at least 1.5 times or at least 2 times shorter than the X extension of the 3D ellipsoid.

Procedure B

In some embodiments, the laser and scanning parameters are set so to fulfill the conditions of procedure A and with the further requirement that the elongated damage region covers at least 70%, at least 90%, or even 100% of the sample thickness or, in the case of layered materials, covers at least all the interfaces between compression and stress layers.

Procedure C (Exemplary Multi-Scan Approach)

In some embodiments, the laser and scanning parameters are set so to fulfill the conditions of procedure A or B and with the further requirement that the pre-cut comprises two or more scans wherein a first scan generates a first plurality of elongated damage region having their center at a first Z coordinate inside the material and a second scan generated a second plurality elongated damage region having their center at a second Z coordinate inside the material, end wherein each elongated damage region can be inscribed in a 3D ellipsoid having the Z extension of the 3D ellipsoid at least 10 times, at least 20 times, or at least 30 times such as 100 times greater than the Y extension of the 3D ellipsoid.

Procedure D

In some embodiments, the laser and scanning parameters are set so to fulfill the conditions of procedure C and wherein the distance between the first and second scan is such to guarantee the concurrent action of a first pulse from the first scan and a corresponding second pulse from the second scan that are launched with the same or similar XY coordinate (their distance in lateral direction being smaller than the distance between two neighboring pulses belonging to the same scan) leads to the formation of a resulting elongated damage region whose extension in the Z direction is larger than the sum of the extensions of the damage regions that would be created independently by said first and second pulses (e.g. if they are shut at large distances in the XY plane).

Procedure E

In some embodiments, the laser and scanning parameters are set so to fulfill the conditions of procedure D and wherein the material is not a layered material and wherein the length of the elongated damage region produced by each single pulse is ≤50% of the sample thickness, e.g. between 30% and 50% of the sample thickness.

Procedure F

In some embodiments, the laser and scanning parameters are set so to fulfill the conditions of procedure A or B and wherein the laser and scanning parameters are set in order to perform the pre-cut by three scans wherein a first scan generates a first plurality of elongated damage region having their center at a first Z coordinate inside the material, a second scan generated a second plurality elongated damage region having their center at a second Z coordinate inside the material, and a third scan generated a second plurality of elongated damage region having their center at a third Z coordinate inside the material, and wherein each elongated damage region can be inscribed in a 3D ellipsoid having the Z extension at least 10 times, at least 20 times, or at least 30 times greater than the Y extension.

Procedure G

In some embodiments, the laser and scanning parameters are set so to fulfill the conditions of any previous procedure and wherein the overall damage volume Vtot produced by a certain number (N) of neighboring pulses is at least 70%, at least 90%, or at least 100% of N*V0, wherein V0 is the typical damage volume produced by an individual pulse far from any neighboring pulse.

Procedure H

In some embodiments, the laser and scanning parameters are set so to fulfill the conditions of any previous procedure and wherein the pre-cut process is performed in the absence of any ablation and/or chemical etching process, and/or any other means which causes local removal of material and/or the formation of a gap between the parts of the material separated by the pro-cut line before completing hte pre-cutting process.

Figure 25:
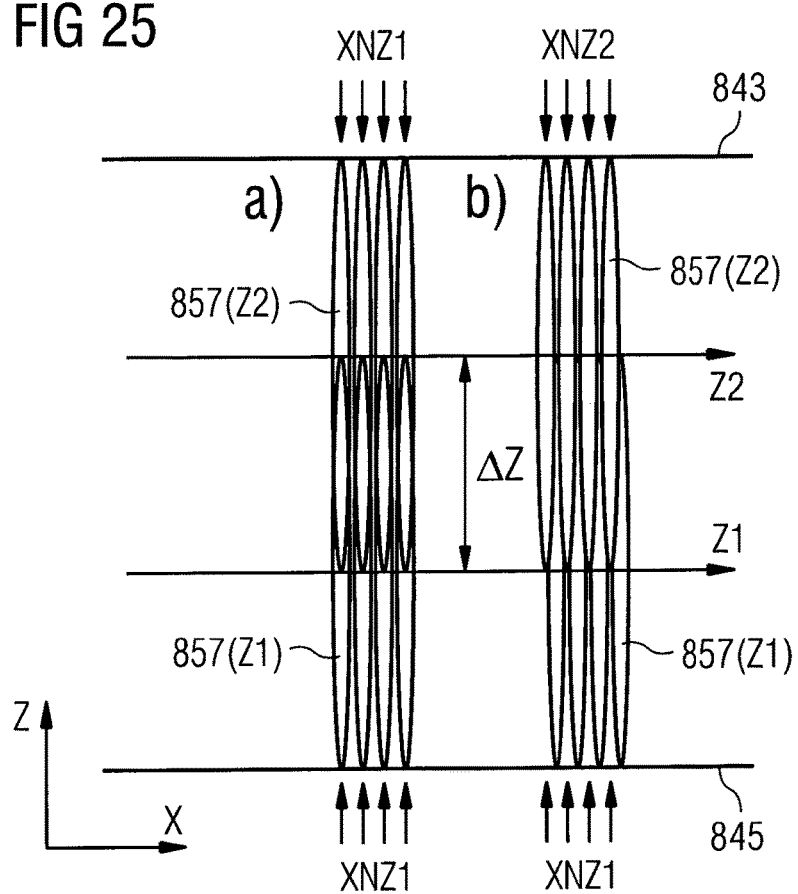
FIG. 25 illustrates exemplary in laser-propagation displaced scan sections.

With respect to the above disclosed multi-scanning approach, FIG. 25 shows two exemplary relative orientations of scans at different height positions. FIG. 25*a*) indicates a displacement in Z-direction, i.e. along the propagation direction of the laser beam while FIG. 25*b*) additionally illustrates a displacement within the separation plane.

Referring to FIG. 25*a*), along scanning direction (X direction) four elongate damage regions 857(Z1) are exemplarily illustrated at positions XNZ1 having a center of extension along Z direction at Z1. Elongate damage regions 857(Z1) extend from a back face 845 to about ⅔ of the complete thickness of the material toward a front face 843. Elongate damage regions 857(Z1) are single laser pulse damage regions with an aspect ratio of larger 10 (of length to width) the separation is in the range of the width of the damage region.

For example, once the complete scanning pattern has been followed, the laser system adjusts its focus position towards front face 843 by ΔZ. Exemplarily shown in FIG. 25*a*), ΔZ is of half of the length of the elongate damage region in Z direction. Then, the same separation line is followed and laser damage regions 857Z2 are position at the same locations XNZ1 along the separation line having a center of extension along Z direction at Z2. Thereby, multi-scan elongate damage zones are created that extend from back face 845 to front face 843.

In contrast to FIG. 25*a*), FIG. 25*b*) shows additionally a displacement of the damage regions of the scan at Z1 and the scan at Z2 by half the displacement dx between subsequent laser damage regions of a scan. Thereby, a continuously extending damage region within the separation line is generated that extends from back face 845 at positions XNZ1 to front face 843 at positions XNZ2.

Accordingly, scanning with multiple different Z positions is performed such that there is no change in Z position between pulses within a single scan along the separation line. Accordingly, the complete scan for the pre-cutting compises a scan along the separation line performed at one Z positon (first scan section) and a second scan performed at a different Z position (second scan section) and so on.

Referring to FIG. 25, the scans at different Z-position are performed with the same displacement between consecutive pulses (e.g. same scan speed and repetition rate). However, also differences in the scans for different Z positions may be set such that, for example, only every second damage region in FIG. 25*a*) is extended by the second scan. Thereby, the spontenuous separation behaviour may, for example, be adjusted. Similarly, the overlap or extension in Z direction may be adapted for proper separation or even self-separation behaviour.

For too strong or thoo thick materials (relative to the elongated damage region that can be set with a given laser system), the number of scans at different Z positions may be larger. Moreover, as shown in FIG. 25, a continuous damage region may be created as an example of a multishot damage region, i.e. a damage region originating from different shots that transition into each other.

The laser system disclosed herein may include a control unit for setting various parameters. For example, optical beam path parameter setting may include setting a conical half-angle in the range from 7° to 12° or 15° such as 9° and laser characteristic parameter setting may include setting a laser energy per pulse incident on the axicon of 32 µJ; a laser wavelength around 1064 nm thereby providing a Bessel-like beam induced damage length inside the sample of at least 50% at least 70% or at least 90% of the sample thickness. Moreover, the control unit may allow setting a scan speed to, for example, 300 mm/s in dependence of the laser repetition rate as well as the distance between neighboring laser induced damage zones. In general, when cleaving the pre-cut material, cracks may be created at the front face/back face that relate to portions of the material which have been either peeled off from the bulk glass or damaged out of plane (i.e. not in the plane of laser propagation) during the process of cleaving (i.e. not due to laser machining). The size of those cracks should be maintained as small during any stage of the cutting (laser pre-cutting and/or cleaving) as one would like to create damages within a plane and, thereby, to allow easy separation of a bulk material into two parts by cleaving and resulting in essentially planar damage zones.

Although the above embodiments are primarily disclosed in connection with single Bessel-like laser beam pulses, the skilled person will appreciate that some aspects (such as aspects relating to pre-cutting a stress layered material) may also be achieved by applying laser interaction based on Gaussian laser beams and involving self-focusing for forming a laser induced damage zone of the required length (also referred to as filament forming Gaussian beams.

It is further noted that, since the cutting of, for example, tempered glass is performed in single-shot and single-pass regime, with a fixed separation between the elongate single shot damage regions, the cutting speed is merely proportional to the laser repetition rate. For example, precise pre-cutting at a scan speed of 300 millimeter/second was achieved—the scan being the limit of the used translation stage. Such a pre-cutting scan speed is not known to the inventors for sample thickness of about 1 mm; in particular not for Gaussian beam cutting.

The herein disclosed cutting approaches may be applied to solid transparent optical materials as described in connection with the figures for tempered glass as well as for non-tempered glass and sapphire. However, alternatively or additionally, also flexible or soft materials may be subject to the disclosed methods. In particular, soft human or animal tissue such as the cornea of the human eye, may be pre-cut using the methods being disclosed herein and based on, for example, pulsed Bessel-like beams.

Modifications of the laser system may include, for example, removing the first telescope illustrated in FIG. 2, i.e. removing components lens L1, block B, and lens L2. Moreover, there may be no need for spatial filtering in those embodiments in which the quality of the tip of axicon lens 15 and the resulting Bessel-like beam is sufficient for tempered glass cutting with the required quality.

In some embodiments, ps pulse durations in the range from 2 ps to 25 ps such as 17 ps or 20 ps may be applied to use commercially available laser systems. Optical adaptation may allow elongate damage regions that have the required properties such as length and radial dimensions.

In some embodiments, a Bessel-like beam with a conical half-angle ($\theta$) in the range from 5° to 25°, for example set to 13.8° or 17°, is applied with a pulse duration in the range between 1 ps and 100 ps in single or multi pass application of a series of laser pulses to respective pre-cut positions.

In some embodiments, samples have a thickness in the range from several 10 µm to several millimeter, such as in the range from at least 100 µm to 5 mm, e.g. from 500 µm to 2 mm, such as 700 µm, 800 µm, 900 µm, or 1 mm.

In general, the separation line of laser damage regions boarders or even surrounds a section of the material that one is interested in to isolate as independent part. In some embodiments, the separation line is scanned (once or several times) with the laser beam. In some embodiments, there is a part of interest on each side of the separation line. To provide a clear cut face, the laser damage regions are located at a single line which may be straight or bend depending on the shape of the part of interest.

While herein lower limits for the distance between neighboring damage regions is disclosed in the range of one or several µm an upper limit may depend on the required quality of the cut face, the lateral extension of the damage regions. Accordingly, an upper limit may be in the range 2 µm to 50 µm such as 4 µm, 9 µm, or 10 µm.

Damage regions may be characterized by the aspect ratio of their extension along the laser propagation direction to the lateral dimension. IN some embodiments the aspect ratio may be in the range from 10 to 1000 or in the range from 50 to 500 such as 100, 200, 300, or 400. For asymmetric lateral shapes such as elliptical shapes, one may consider the aspect ratio based on the direction with the smallest diameter, e.g. the smaller axis of an ellipse. A damage region extending completely across a plate would accordingly be based on the ratio of the thickness of the plate to the lateral dimension of the damage region, such as 700 µm/1 µm=700 or 700 µm/10 µm=70 or 1000 µm/10 µm=100 or 100 µm/10 µm=10.

As shown in FIG. 5, pre-cutting path 25 defines the positions of circles 27, e.g. the pre-cut positions of the laser beam. While in FIG. 5, circles 27 have centers $X_{N-1}$, $X_N$, $X_{N+1}$ schematically on a straight line, centers $X_{N-1}$, $X_N$, $X_{N+1}$, . . . may also be provided on curved lines to thereby result in curved parts such as parts having curved corners which are connected by straight lines. The curvature radius may, for example, be in the range from several micron to meters such as in the range from 100 µm to 10 mm. Accordingly, $X_{N-1}$, $X_N$, $X_{N+1}$ is not understood as only a position along the x-coordinate of translation mechanism 9 (referring to FIG. 1) but generally as a position X on the sample 3 (i.e. including x- and y-coordinates).

A displacement distance dx of 1 µm may, for example, be reached with a travel speed of 100 mm/s and a repetition rate of 100 kHz. Thus, depending on the repetition rate and the table movement, the displacement distance dx can be selected such that there is essentially no overlap or that there is an overlap between neighboring single pulse damage regions.

Although the preferred embodiments of this invention have been described herein, improvements and modifications may be incorporated without departing from the scope of the following claims.

The invention claimed is:

1. A method for laser pre-cutting a layered material with a pulsed Bessel-like laser beam or a filament forming Gaussian beam, wherein the layered material comprises at least one tensile stress layer, at least one compression stress layer, and at least one interface region between the at least one tensile stress layer and the at least one compression stress layer and the layered material is transparent to allow propagation of the laser beam through the layered material, the method comprising:

setting an optical beam path and a laser characteristic of the laser beam such that an interaction of the laser beam with the layered material generates an elongate single laser pulse damage region in the layered material; and for each of a series of pre-cut positions of the layered material, pre-cutting the layered material by positioning the layered material and the laser beam with respect to each other and irradiating the laser beam such that the respective elongate single laser pulse damage regions extend across the at least one interface region.

2. The method of claim 1, wherein the optical beam path and the laser characteristic of the laser beam are set such that:

the elongate damage region is characterized by an aspect ratio in the range from 10 to 1000; or the distance between neighboring elongate damage regions is in the range from 0.5 μm to 4 μm; or the laser pulse duration is in the range from 1 ps to 100 ps; or the Bessel-like beam has a conical half-angle in the range from 4° to 30°.

3. The method of claim 1, wherein:

the layered material comprises a front face, and the at least one tensile stress layer or the at least one compression stress layer is positioned between the front face and the at least one interface region; and the pre-cutting is performed such that the respective elongate damage region extends from the front face through the at least one tensile stress layer or the at least one compression stress layer and across the at least one interface region into a respective neighboring layer; or the layered material comprises a back face, and the at least one tensile stress layer or the at least one compression stress layer is positioned between the back face and the at least one interface region, and the pre-cutting is performed such that the respective elongate damage regions extend from the back face through the at least one tensile stress layer or the at least one compression stress layer and across the at least one interface region into the respective neighboring layer.

4. The method of claim 1, wherein the layered material comprises a center tensile stress layer or a center compression stress layer that is centered between a pair of interface regions, and wherein the pre-cutting is performed such that the respective elongate damage regions extend at least through 30% of the center tensile stress layer or the center compression stress layer.

5. The method of claim 1, wherein the pre-cutting is performed such that the respective elongate damage regions extend at least through 50% of a thickness of the layered material.

6. The method of claim 1, wherein the pre-cutting is performed for neighboring elongate damage regions such that the neighboring elongate damage regions are displaced with respect to each other by a distance of at least 1 μm.

7. The method of claim 1, wherein the laser beam is a pulsed Bessel-like laser beam or a filament forming Gaussian beam, and wherein the pre-cutting is performed with a single laser pulse for each pre-cut position such that the elongate damage regions are a single laser pulse damage regions or the layered material is essentially transparent with respect to single photon absorption of the laser beam when propagating through the material.

8. The method of claim 1, wherein single laser pulse, damage regions of successive laser pulses following immediately one another are displaced with respect to each other at a first level within the material for a first scanning sequence and at a second level within the material for a second scanning sequence.

9. The method of claim 1, wherein the material has a plate-like shape and the scanning is performed in direction of the extension of the plate such that neighboring elongate single laser pulse damage regions are displaced with respect to each other by a minimum distance of at least 80% of a beam waist at full width half maximum of a core of the pulsed Bessel-like laser beam present within the single laser pulse damage region, or by at least 1 μm, such that the displacement of neighboring elongate single laser pulse damage regions is selected such that a first single laser pulse damage region of a first pulse essentially does not affect the propagation of a second pulse generating a second single laser pulse damage region next to the first single laser pulse damage region.

10. The method of claim 1, wherein the optical beam path and the laser characteristic are selected such that a multi-photon process in the regime of optical breakdown photoionization is the underlying process of the single laser pulse damage, thereby defining a damage threshold for parameters of the optical beam path and the laser characteristic of the Bessel-like laser beam, and wherein the pulse duration is selected such that the multi-photon process is accompanied by an electron avalanche photoionization.

11. The method of claim 1, further comprising:

receiving information on a thickness of the material;

determining a minimum length of the elongate single laser pulse damage region that is required for breaking the material with a preset break quality;

for the pre-cutting, determining a pulse energy above a minimum laser pulse energy corresponding to the minimum length; and performing at least one of the following selections:

for the minimum laser pulse energy and a set conical half-angle, selecting a pulse duration above a threshold laser pulse duration for single laser pulse damage or selecting a beam diameter of the pulsed Bessel laser beam before a final focusing lens;

for at least the minimum laser pulse energy and a set pulse duration, selecting a conical half-angle above a threshold conical half-angle; or selecting the laser pulse energy, the conical half-angle, or the pulse duration;

such that the single laser pulse damage regions extend at least over the minimum length or such that a peak fluence of the pulsed Bessel-like laser beam stays above a threshold for optical break down at least for the determined minimum length.

12. The method of claim 1, further comprising separating a material part from a material comprising at least one tensile stress layer, at least one compression stress layer, and at least one interface region between the at least one tensile stress layer and the at least one compression stress layer, by the steps of:

applying a separating force onto the layered material that acts across the series of pre-cut positions, thereby cleaving the layered material along the series of pre-cut positions; or applying a temperature difference across the layered material;

wherein the extent of the elongate damage regions is sufficient that after a time interval the internal stress of the stress layers initiates self-separation of the material part.

13. The method of claim 1, wherein the optical beam path and the laser characteristic of the laser beam are set such that:
   the laser pulse duration is in the range from 1 ps to 100 ps; and
   the Bessel-like beam has a conical half-angle in the range from 5° to 30°.

14. The method of claim 1, wherein the elongate single laser pulse damage region has a cross-section with an asymmetric shape.

15. The method of claim 1, wherein the elongate single laser pulse damage region has a cross-section with an elliptical shape.

16. The method of claim 15, wherein the elliptical shape has a longer axis oriented along a path defined by the series of pre-cut positions.

17. The method of claim 1, wherein the elongate single laser pulse damage region has a volume with an ellipsoid shape.

18. The method of claim 17, wherein the elliptical shape has a longer axis oriented along a path defined by the series of pre-cut positions.

\* \* \* \* \*